(12) United States Patent
Blowers

(10) Patent No.: US 8,494,927 B2
(45) Date of Patent: Jul. 23, 2013

(54) METHOD FOR PROVIDING A WEB-BASED PAYROLL AND PAYROLL RELATED SOFTWARE AS A SERVICE

(76) Inventor: Alden J. Blowers, Incline Village, NV (US)

( * ) Notice: Subject to any disclaimer, the term of this patent is extended or adjusted under 35 U.S.C. 154(b) by 0 days.

(21) Appl. No.: 11/780,633

(22) Filed: Jul. 20, 2007

(65) Prior Publication Data
US 2008/0021799 A1 Jan. 24, 2008

Related U.S. Application Data

(63) Continuation-in-part of application No. 11/763,348, filed on Jun. 14, 2007, which is a continuation-in-part of application No. 11/054,993, filed on Feb. 9, 2005, which is a continuation-in-part of application No. 10/678,326, filed on Oct. 3, 2003.

(51) Int. Cl.
| | | |
|---|---|---|
| G07B 17/00 | (2006.01) | |
| G07F 19/00 | (2006.01) | |
| G06Q 40/00 | (2012.01) | |
| G06Q 40/02 | (2012.01) | |

(52) U.S. Cl.
CPC ............... *G06Q 40/00* (2013.01); *G06Q 40/10* (2013.01); *G06Q 40/02* (2013.01)
USPC ................ 705/30; 705/45; 717/171; 717/176

(58) Field of Classification Search
CPC ......... G06Q 40/10; G06Q 40/02; G06Q 40/00; G06Q 20/42
USPC ............... 705/1, 9, 30, 32, 45; 717/107, 117, 717/171, 176; 714/E11.218
See application file for complete search history.

(56) References Cited

U.S. PATENT DOCUMENTS

| | | | |
|---|---|---|---|
| 5,117,356 A | 5/1992 | Marks | |
| 5,987,433 A | 11/1999 | Crapo | |
| 6,401,079 B1 * | 6/2002 | Kahn et al. | 705/30 |
| 6,411,938 B1 * | 6/2002 | Gates et al. | 705/30 |
| 6,606,606 B2 | 8/2003 | Starr | |
| 7,039,898 B2 * | 5/2006 | Shah | 717/107 |
| 7,089,200 B2 * | 8/2006 | Bode | 705/32 |
| 7,305,347 B1 | 12/2007 | Joao | |
| 7,716,094 B1 | 5/2010 | Sutter et al. | |
| 2002/0184148 A1 | 12/2002 | Kahn et al. | |
| 2003/0225638 A1 * | 12/2003 | Secola | 705/30 |
| 2004/0010776 A1 * | 1/2004 | Shah | 717/117 |
| 2004/0015950 A1 * | 1/2004 | Dutta et al. | 717/171 |
| 2004/0111361 A1 | 6/2004 | Griffiths et al. | |

(Continued)

OTHER PUBLICATIONS

Piturro, M. (1998). Payroll for hire. Accounting Technology, 14(2), 45-52. Retrieved from http://search.proquest.com/docview/214018374?accountid=14753.*

(Continued)

*Primary Examiner* — Matthew Gart
*Assistant Examiner* — Olusegun Goyea
(74) *Attorney, Agent, or Firm* — Blakely, Sokoloff, Taylor & Zafman

(57) ABSTRACT

A method for providing payroll processing software as a service to payroll providers such as payroll vendors and end users. The software developer contracts with the payroll provider to provision, administer and support the payroll processing software thereby allowing the payroll provider to concentrate on its core business of payroll processing.

22 Claims, 15 Drawing Sheets

U.S. PATENT DOCUMENTS

| | | | |
|---|---|---|---|
| 2004/0148215 A1* | 7/2004 | Visconti et al. | 705/9 |
| 2005/0010501 A1* | 1/2005 | Ward | 705/30 |
| 2006/0021799 A1 | 2/2006 | Hall et al. | |
| 2007/0136156 A1 | 6/2007 | Seeley et al. | |
| 2010/0042518 A1 | 2/2010 | Handa et al. | |
| 2010/0138323 A1 | 6/2010 | Gowda et al. | |

OTHER PUBLICATIONS

Cheney, G. (1998). Making payroll a profit center. Accounting Technology, 14(9), S3-S10. Retrieved from http://search.proquest.com/docview/214016577?accountid=14753.*

Needleman, T. (2003). Today's payroll apps offer plenty of choices. Accounting Today, 17(14), 26-30. Retrieved from http://search.proquest.com/docview/234449713?accountid=14753.*

Final Office Action for U.S. Appl. No. 11/054,993, mailed Jan. 23, 2009, 8 pages.

Non Final Office Action for U.S. Appl. No. 10/678,326, mailed Dec. 24, 2008, 11 pages.

Non final Office Action for U.S. Appl. No. 10/678,326, mailed Nov. 15, 2007, 10 pages.

Alexander, Marcus, et al., "Strategic Outsourcing", *Long Range Planning*, vol. 29, No. 1, pp. 116-119, 1996, Copyright 1996 Elsevier Science Ltd.

Non final Office Action for U.S. Appl. No. 10/678,326 dated May 12, 2010.

Final Office Action for U.S. Appl. No. 10/678,326 dated Jun. 2, 2008.

Final Office Action for U.S. Appl. No. 10/678,326 dated Aug. 4, 2009.

Final Office Action for U.S. Appl. No. 11/780,633 dated Apr. 21, 2009.

Non final Office Action for U.S. Appl. No. 11/763,348 dated Jul. 7, 2009.

Final Office Action for U.S. Appl. No. 11/763,348 dated Dec. 30, 2009.

Non-Final Office Action mailed Jan. 12, 2012 for U.S. Appl. No. 13/051,868.

Non-Final Office Action mailed May 29, 2012 for U.S. Appl. No. 13/051,868.

Non-Final Office Action mailed Aug. 31, 2012 for U.S. Appl. No. 13/051,868.

Non-Final Office Action mailed Feb. 14, 2012 for U.S. Appl. No. 10/678,326.

* cited by examiner

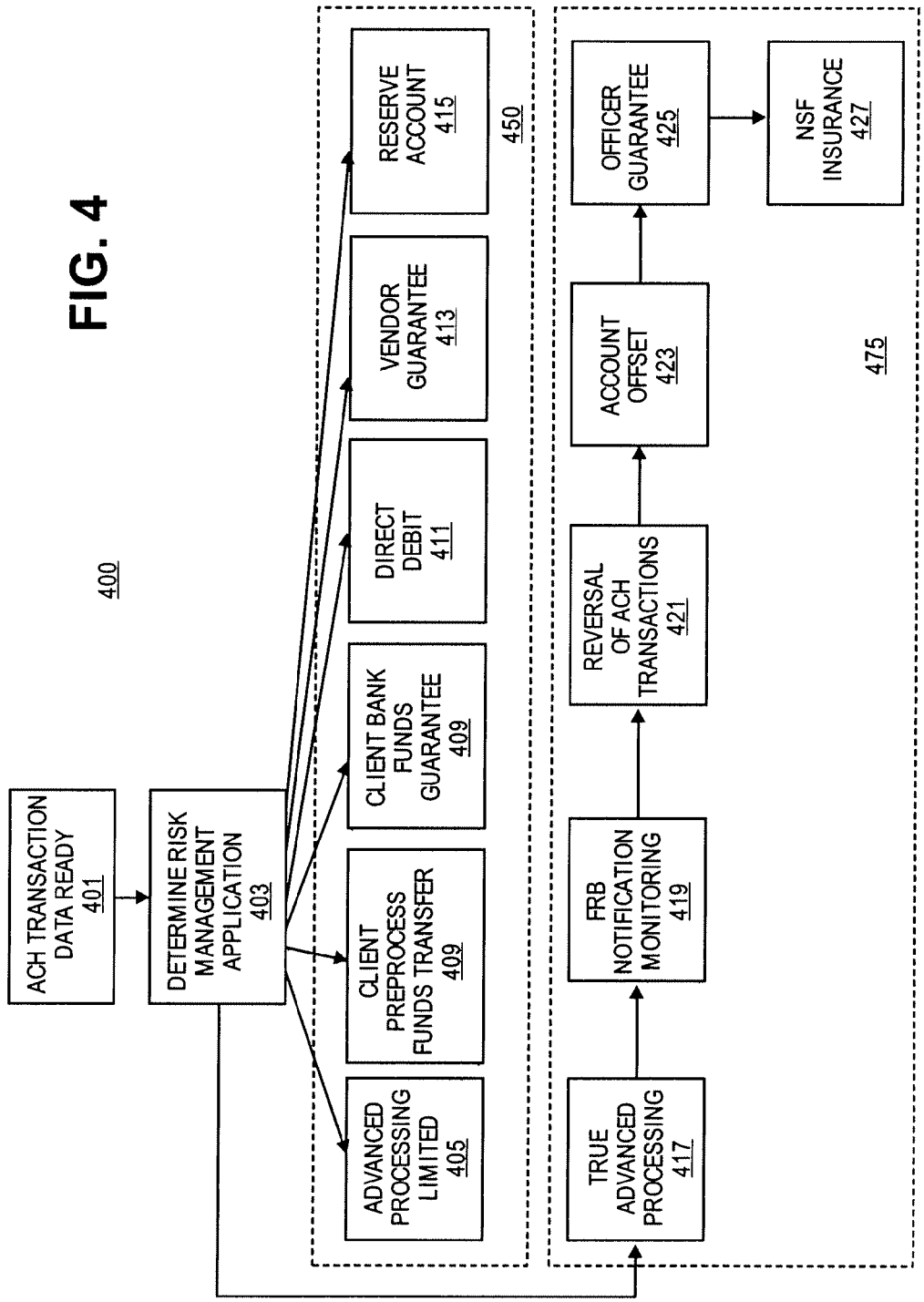

METHOD FOR PROVIDING A WEB-BASED PAYROLL AND PAYROLL RELATED SOFTWARE AS A SERVICE

CROSS-REFERENCE TO RELATED APPLICATIONS

The application is a Continuation-In-Part of co-pending application no. 11/763,348, filed Jun. 14, 2007, by Applicant Alden J. Blowers, entitled "Payroll File Management," which is a Continuation-In-Part of co-pending application Ser. No. 11/054,993, filed Feb. 9, 2005, by Applicant Alden J. Blowers, entitled "Method for Providing Web-based Payroll Tax Trust Management and Related Services." That application was a Continuation-In-Part of co-pending application Ser. No. 10/678,326, filed Oct. 3, 2003, entitled "Method for Providing Comprehensive ACH Payroll Vending Services."

BACKGROUND

1. Field of the Invention

The invention relates to automated financial services. Specifically, the embodiments of the invention relate to the provision of these services as software components and the support of these software components.

2. Background

Automated payroll services systems are provided to end users (e.g., businesses and similar organizations) via a vendor (e.g., a business that sells automated payroll services to their clients who are end users). The end user and/or vendor of automated payroll service systems must interact with and use multiple service providers in order to carry out financial transactions related to payroll processing including tax payment processing, trust fund processing, investment of funds, and similar financial transactions.

The need to interact with multiple "outside" service providers to carry out payroll management places a burden on vendors and/or end users of payroll service systems to produce the varied financial data required by these "outside" financial service providers. Each service provider (i.e., trust fund management provider, tax payment processor and similar service providers) has independent systems to implement its services. These independent systems each require the end users/and or vendors to train staff on the software components (e.g., software applications that generate files for or manage payroll processing, ACH transactions and similar financial services) that implement the respective financial systems. If the vendor provides this support service to the end user, then it detracts from the main focus of the vendor's business as a payroll processor. Instead of focusing on its core business it is forced to provide technical support to the end users. If the vendor does not provide this support, then the end users are forced to train and support their own staff and interact with both the vendor and the software developer to address any problems in the use or management of the software and the overall system. Similarly, the vendor must train its staff on the use and management of the software components that implement the services that it offers to the end users. This problem can be further exacerbated if the vendor utilizes software components from multiple developers.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 4 is a diagram of a risk management system.

DETAILED DESCRIPTION

Figure 1:
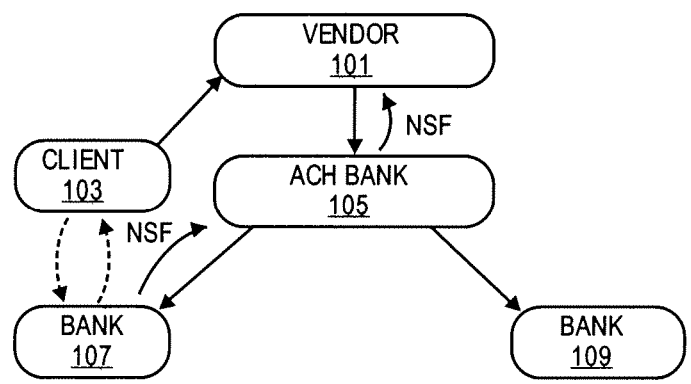
FIG. 1 is a diagram of the interrelationship of parties in an ACH transaction

FIG. 1 illustrates the relationship between a client 103, a vendor 101, an originating depository financial institution (ODFI) 105 and recipient depository financial institutions (RDFI) 107; the client's bank 107 and other banks 109. A client 103 (i.e., end user) may be a business or organization. The client 103 has a bank account at RDFI 107. A vendor 101 may be a business offering financial services such as payroll processing (i.e., payroll provider) or similar services. ODFI 105 is any entity that will process ACH transactions. RDFI 107 and 109 are recipient banks, the beneficiary of an ACH transaction requested by client 103 and processed by vendor 101 and ODFI 105, the RDFI 109 may be the bank of an employee of client 103 or similar recipient having a bank account at RDFI 109.

Client 103 transmits transaction data to vendor 101 such as payroll data or similar financial transactions. Vendor 101 processes the data into a set of ACH transactions. Vendor 101 transmits the ACH transactions to ODFI 105. ACH bank 105 processes each ACH transaction and tracks the transactions. The ACH transactions, if successful, electronically transfer funds from the client's account at bank 107 to recipient's account at recipient's bank 109. If the client does not have sufficient funds with bank 107 a non-sufficient funds (NSF) notice will be returned to ODFI 105 and vendor 101. However, the ODFI 105 will deposit the intended amount in recipient's bank account, because each ACH transaction is processed separately and independently. Thus, vendor 101 must cover the NSF and attempt to collect this amount from client 103.

Figure 2:
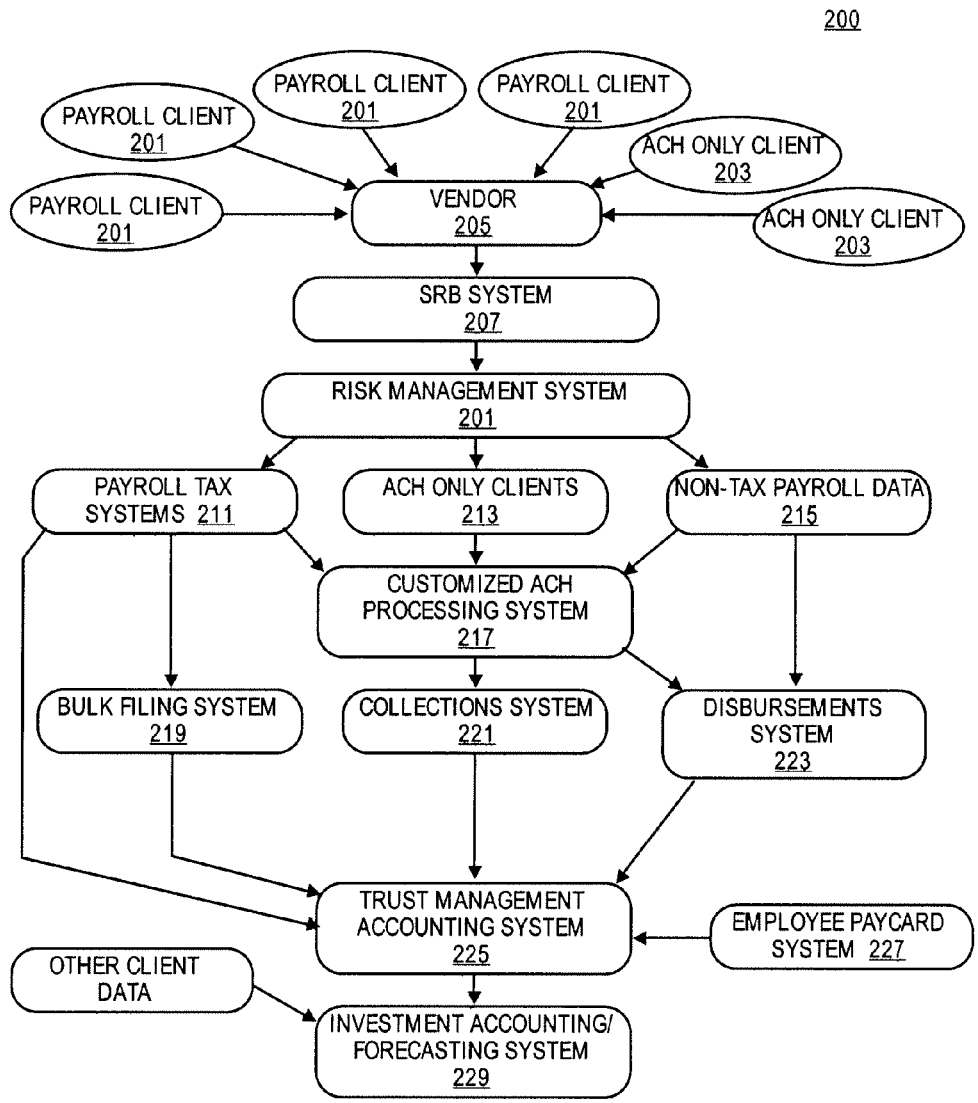
FIG. 2 is a flowchart of an automated system of managing financial transactions.

FIG. 2 is a flowchart of an automated financial transaction system 200. In one embodiment, vendor 205 provides a set of financial services (e.g., payroll services, ACH processing) to each client 201, 203. In one embodiment, client 201 uses vendor's payroll processing services. In another embodiment, client 203 may process its own payroll but use vendor's 205 ACH transaction services. In one embodiment, client 201, 203 does not use a vendor 205. Instead client 201, 203 interacts directly with an automated system 200 provider.

Vendor 205 receives financial transaction files from a set of clients 201, 203. The clients include payroll clients 201, ACH only clients 203 and similar client financial transaction types and sources. Vendor 205 compiles or receives incoming payroll data, ACH transaction requests and similar financial transactions in a set of transaction files. The vendor 205 may receive incoming payroll data including organization information in a client master file (CMF) or similar file. A CMF may include health benefits plan information, pay rates, employee status information and similar organization wide data. In one embodiment, CMF and transaction data are submitted to vendor 205 in a single periodic batch file from each client 201, 203. For example, client 201 may submit a file including transaction data and CMF data every two weeks, or similar period of time. A file may include multiple batches. A batch is a set of related data such as a payroll batch, tax batch, or similar set of data. For example, a file may include multiple payroll and tax batches.

In one embodiment, vendor 205 transmits the transaction file with CMF data via a network, a dial up connection, or similar electronic method to a server of automated system 200 provider. In one embodiment, the network is the Internet. Vendor 205 or client 201 interacts with a web-based interface to submit the transaction file and CMF data to the server. The transaction file with CMF data is transmitted to the server using encryption such as Rivest-Shamir-Adelmar (RSA), Pretty Good Privacy (PGP), Data Encryption Standard (DES), Secured Socket Layer (SSL), or similar encryption tools. The submission of data to system 200 may be in a single batch file or multiple files. Each batch file may include multiple transaction or CMF files. In another embodiment, batch files may include transaction files, CMF files, tax data, direct deposit data, fee collection data, agency check data or other data as may be required by an originator as part of a transaction file or separate from the transaction file.

Figure 3:
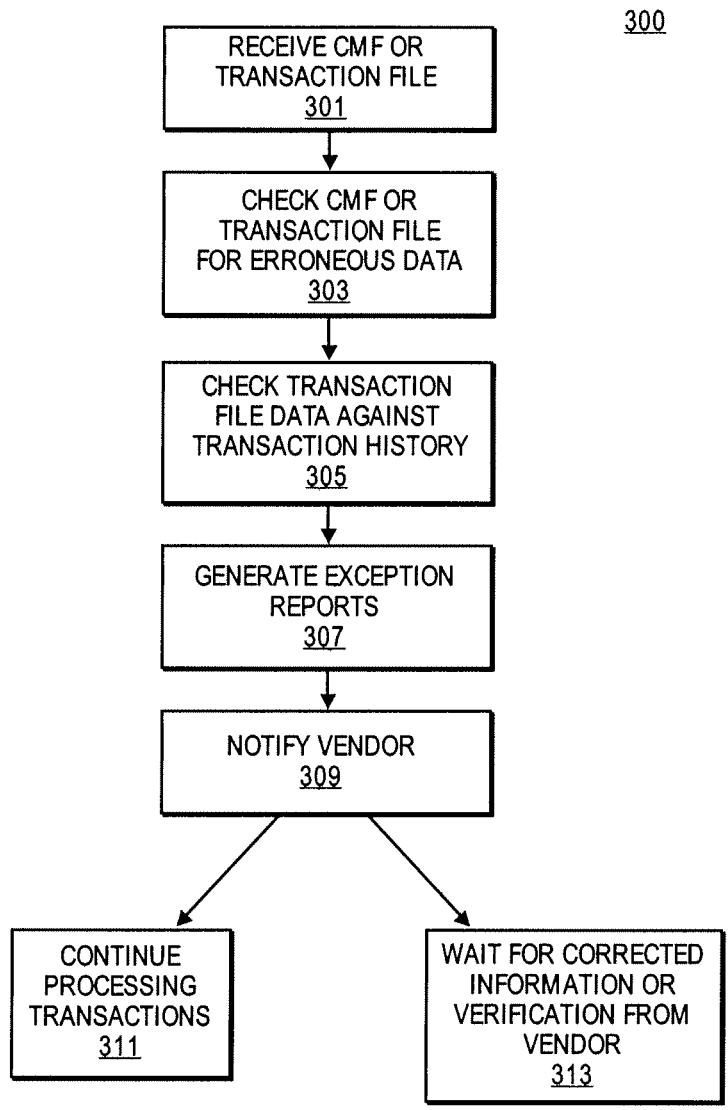
FIG. 3 is a diagram of a verification subsystem.

When the transaction file with CMF data from a vendor is received it can be processed by the scheduling/receiving/balancing (SRB) system. Processing occurs on a server running automation system 200. FIG. 3 is a flowchart of the SRB system 207. SRB system 207 receives a transaction file with CMF data from a vendor (block 301). SRB system 207 then processes the transaction file with CMF data to check for errors in the data (block 303). The errors checked for in the transaction file include duplicate transaction data, adjusted transaction data, internal contradictions in the data such as year to date values that are not equal to the cumulative individual transactions, improperly balanced financial data corrupted data, unexpected receipts, client files expected but not received, clients received but not expected, and similar discrepancies that can be determined by use of the data in the transaction file. Similar checks of CMF data may be carried out to verify the coherency of data related to the client's organization (e.g., medical plan, cafeteria plan and similar organizational level information.)

Data in the transaction files is then verified against the transaction history of the individual clients and vendors (block 305). Transaction history verification can include a check of prior balance data against data submitted in the transaction files including year to date (YTD) gross payroll balances, all relevant tax data, a check for clients of vendors added or missing from prior transaction file data, unusual transaction amounts and similar analysis of transaction file data.

In one embodiment, additional tracking data is collected including a time check to determine the timeliness of the submission of the transaction file in order to track late fees, statistical data regarding the numbers of transmission files submitted, dollar amounts utilized and similar data. This data may be used to generate reports and notify collections system 221 of services rendered.

After the error and verification processes complete in SRB system 207, exception reports are generated. The exception reports include a listing of errors detected and possible discrepancies found in the transaction file with CMF data (block 307). The exception report may be displayed via a web browser or network application, electronically transferred over a network, facsimile or similar process, printed or delivered by similar manner to inform the vendor 205 and/or client 201, 203 of the potential problems with the transactions in the transaction file with CMF data (block 309).

A set of the transactions contained in the transaction file may be processed without further correction (block 311). The exception report can be used as a means for subsequent correction of actual errors by submitting further transactions or internal correction by a vendor 205 or client 201, 203 of their transaction and accounting data. In one embodiment, a set of the transactions submitted in the transaction file will not be further processed when a potential error is found until confirmation or correction of the data is obtained from the vendor 205 or client 201, 203 (block 313). In another embodiment, the type of transactions that require verification can be specified by a client 201, 203 or vendor 205 such that only the designated types of transactions require verification if potential errors related to them are found. Data verification of SRB system 207 may be executed by a server or similar system maintained by a service provider. Notification of errors may be generated and sent electronically.

FIG. 4 is a diagram of the risk management system 400. In one embodiment, after the incoming transaction file has been processed by the SRB system 207, the ACH transaction set associated with the transaction file is prepared for final processing (block 401). Before final processing of the ACH transactions, the client 201, 203 and vendor 205 information associated with the ACH transactions is analyzed to determine the risk management system that is to be utilized (block 403). The risk management system 400 applied to the ACH transaction may be selected by system 200 or ODFI 105 based upon a client or vendor history. In one embodiment, the timing of the ACH transactions influences how the risk management system is applied. In one embodiment, the risk management system 400 is applied on a client by client basis. In another embodiment, the risk management system is applied on a vendor by vendor basis. Risk management schemes may be elected by a client 201, 203 or vendor 205 through a web-based interactive account preferences management systems dedicated application or similar interface, at the time of initial enrollment in the automated system 200 service or subsequent thereto.

The risk management schemes provide the client 201, 203 and vendor 205 a set of bonding services to limit vendor 205 liability in processing the client 201, 203 transactions in the form of the risk management options discussed herein below.

A first risk management option involves limited advanced processing of the transactions (block 405). These transactions must be received in a transaction file at least 48 hours before the required settlement date of the transactions. For example, the federal reserve bank (FRB) settlement date or a client's payroll check disbursement date. If a client 201, 203 or vendor 205 elects this system of risk management, but does not provide the formatted transaction file data by the advanced date, the client 201, 203 must then transfer (i.e., by wire or similar mechanism) funds needed to settle a transaction at least the day before the settlement date in order to ensure the proper processing of the transaction.

In a second option, the client 201, 203 pre-authorizes a fixed funds transfer (block 407). The fixed funds transfer may be from client's bank account or similar account. The fixed funds transfer may occur approximately 48 hours prior to a settlement date. The fixed amount to be transferred can be based on the average of the client's payroll liabilities based on the client's transaction history. The prior history of transactions over the prior ninety days is used to determine the fixed funds transfer amount. An additional amount, for example 10 percent may be included to cover variations from the average. This additional amount can be determined based on the range of deviation in past transactions or similar data. Fixed fund transfer amounts are determined based on a detected pattern of prior transactions or a selected pattern of transactions. For example, clients having bi-weekly or weekly payroll liabilities with different liability levels for alternating settlement dates have an adjusted fixed fund transfer amount based on the alternative pattern.

In a third risk management option, client 201, 203 has a funds availability guarantee supplied by its bank (block 409). Client 201, 203 obtains an authorization from its bank for ACH transactions generated by the system 200 that guarantees sufficient funds availability. If client 201, 203 does not have sufficient funds at the time of an ACH transaction, the bank assumes liability of funding the ACH transactions that have been scheduled for that client 201, 203.

In a fourth risk management option, client 201, 203 establishes with its bank authorization for direct debit for ACH transactions (block 411). When system 200 processes ACH transactions from the transaction file all funds needed for payments are directly debited out of each client's account at client's bank.

In a fifth risk management option, a vendor guarantees funds availability for a specific client or set of clients (block 413). The client has an authorization from vendor 205, which guarantees liability by vendor 205 to ensure funds availability for all ACH transactions.

In a sixth risk management option, client 201, 203 maintains a "reserve" account with the provider of system 200 (block 415). The provider manages the reserve account to maintain funds in an amount approximately equal to the average monthly funds processed over a designated period of time, on a per cycle basis. The designated period of time is ninety days. In one embodiment, the reserve account has a minimum balance equal to the largest single ACH transaction amount processed by the system 200 for client 201, 203 in a defined time period. This defined time period may be a year previous to a given date. Client 201, 203 may establish the account over a period of time or at a single time.

A different system of risk management is used for transactions executed well in advance (e.g., more than two days) of the settlement date (block 475) from the immediate transactions (block 450). Clients 201, 203 that submit transaction data files more than two days in advance of a settlement date can be processed as received (block 417). Risk is minimized by post ACH transaction actions. The FRB return notification system may be closely monitored for each ACH transaction as well as similar return notification systems (block 419). Returned transactions may be immediately reported to the vendor 205 or client 201, 203 in order to correct the transactions prior to the settlement date.

Failed or flawed transactions may be reversed (block 421). If the FRB notifies system 200 of any returned transaction, the transaction may be reversed. Reversals can be applied to transactions involving, employee direct deposits, employee payment card deposits, tax payments and any other transactions that may affect a recipient (e.g., an employee or client associated entity). Reversals are retroactive to the time when the amount to be collected represents the total amount required to keep a trust account whole. The clients 201, 203 form agreements with their recipients (e.g., employees) to allow reversals.

In one embodiment, returned transactions are offset using funds held in trust, or similar accounts held by a client 201, 203, entities related to the client (e.g., client's bank, officers of client or similar entities), or a vendor 205 (block 423). These funds are used to offset funds used from a system 200 trust.

Officers, directors or similar entities related to a client or vendor may directly guarantee funds by agreeing to personal liability (block 425). If the client fails to reimburse a returned transaction, the personal guarantors of the client will be required to take necessary action to collect or assume these liabilities. In one embodiment, the guarantors make agreements to take personal liability at the time that service is established for a client. These guarantees may be by means of legal contract or similar arrangement.

The clients 201, 203 and vendors 205, or system 200 provider may opt for an NSF insurance program (block 427). Should an NSF item become uncollectable or should a bank approve an ACH transfer and then renege and refuse to accept liability the NSF insurance will cover the transaction.

Details of each risk management scheme are stored for each client 201, 203 and vendor 205 by system 205. This data is used to generate notices sent electronically or to generate reports to be sent to a client 201, 203 or vendor 205. This data is also shared with the collections 221 and funds management systems 225. Risk management system 201 may be executed by a server or similar system maintained by a service provider.

Returning to the discussion of the components and features of FIG. 2, ACH transactions submitted to the system 200 in the transaction files may relate to payroll payments. In one embodiment, payroll taxes associated with these transactions are processed by tax system 211. The payroll tax system 211 allows a client 201, 203 or vendor 205 to provide the payroll tax data based on their own in house software, third party software, customized third party software and combinations thereof. If the client uses third party or in house payroll tax software, the format of the data will have to be formatted into a CMF or transaction file format. In one embodiment, system 200 includes a network based or stand alone conversion software to format third party or in house software generated data into a CMF or transaction file format.

Client 201, 203 or vendor 205 may also use the integrated payroll tax processing software of system 211. This software generates payroll tax data in a defined transaction file format. Vendor 205 or client 201, 203 may contract separately to use system 211 payroll tax software as a stand alone application or a network based application. In one embodiment, the network based application uses the Internet. A vendor 205 or client 201, 203 interfaces to the Internet based application and uploads payroll and similar data to the payroll tax application. The Internet payroll tax software may be owned by system 200 provider and the vendor 205 or client 201, 203 contracts for use of the payroll software. The Internet based tax application may be maintained by system 200 provider. The tax application may be updated for changes to tax regulations, or correction of the application. Updates may be made via a network, or via the Internet. Other data related to the system 200 may be submitted with payroll tax data to the tax system 211 via an Internet based application and/or stored by the tax application. System 200 can access the stored data of tax system 211 to carry out transactions including posting to vendor 205 or clients 201, 203 trust accounts, transaction processing, and similar processing that may use data stored by the tax system 211.

In one embodiment, the payroll tax application of tax system 211 is a remote system leased or owned by the vendor 205 or client 201, 203. This payroll tax application will have versions capable of being executed on various operating systems (e.g., Microsoft® Windows, Apple® OS 9.x, Unix based systems and similar operating systems) and hardware platforms. The remote application stores payroll tax data and other relevant data. System 200 may access this stored data for posting to a trust account, processing transactions or similar activities. System 200 may access this data over a secured network connection or similar manner of interconnectivity.

Tax system 211 prepares tax data related to a payroll of a client 201, 203 or vendor 205 for the filing of appropriate tax deposits and returns dependent on tax regulations for the jurisdiction of the client 201, 203 or vendor 205. Tax system 211 may be run on the server of system 200 or may be run on a separate server. System 200 in connection with the payroll tax system 211 can process accounts payable items as needed by the vendor 205 or client 201, 203 in addition to the tax payroll processing. Tax payroll processing software of system 211 is a double entry system and standard accounting practices are used to ensure that the system 200 maintains correct balances for all clients 201, 203 and vendors 205. Client 201, 203 or vendor 205 may view account status and information regarding tax data through a web-based interface or a specialized application that can connect with system 200.

Payroll tax application system 211 includes a quarter end calculation system. The quarter end system uses double entry. The client 201, 203 or vendor 205 transmits the accumulated and calculated quarterly payroll data in a separate and discrete file to system 200 and payroll tax system 211. In one embodiment, the submitted data is in a standardized format. In one embodiment, payroll tax system 211 checks the submitted data against data previously stored by tax system 211 to determine the accuracy of newly stored information, by testing the submitted data for YTD gross, continuation reports, clients due to be received and similar data. Vendors 205 or clients 201, 203 will receive reports generated by the system 211 of discrepancies via a web-based interface, SMTP messages, printed messages or similar notification. Vendor 205 or client 201, 203 may use such notification to correct internal data or notify system 200 of inaccurate data.

Quarter end submitted files are stored in quarter end ledgers. This information is combined with prior quarter data and amended return data stored by tax system 211 or system 200. This data is balanced by payroll tax system 211 per client's federal employer identification number. All taxes due are then paid by payroll tax system 211 by automatic deposit, i.e., ACH transaction, by generating a check or by similar payment methods. The appropriate tax returns are also filed by tax system 211. Any variance between quarter to date data and current ledger data is posted to client's ledger and a quarter end reconciliation package report is generated and forwarded to the client. Annual returns, if required, will also be filed by the tax system 211. Vendor 205 or client 201, 203 action may be required if discrepancies are found to authorize further processing or verify data.

Tax system 211 supports bulk filing 219 of payroll taxes. Instead of processing individual deposits, bulk filing 219 allows for the depositing of multiple clients' payroll taxes with federal, state, and local tax authorities on a bulk basis. Many vendors, due to taxing authority volume restrictions, may not qualify for bulk filing programs made available by the taxing authorities. Tax system 211 provides vendors 205 and client 201, 203 with the option of bulk filing 219. The vendor 205 or client 201, 203 may select which tax authorities it desires to bulk file 219 with, such as the Internal Revenue Service or state tax authorities, for each state that a client must file in, and city or other local tax authorities if applicable. Vendors 205 and clients 201, 203 may determine tax system and bulk filing preferences through a web-based interface or similar interface.

Figure 5A:
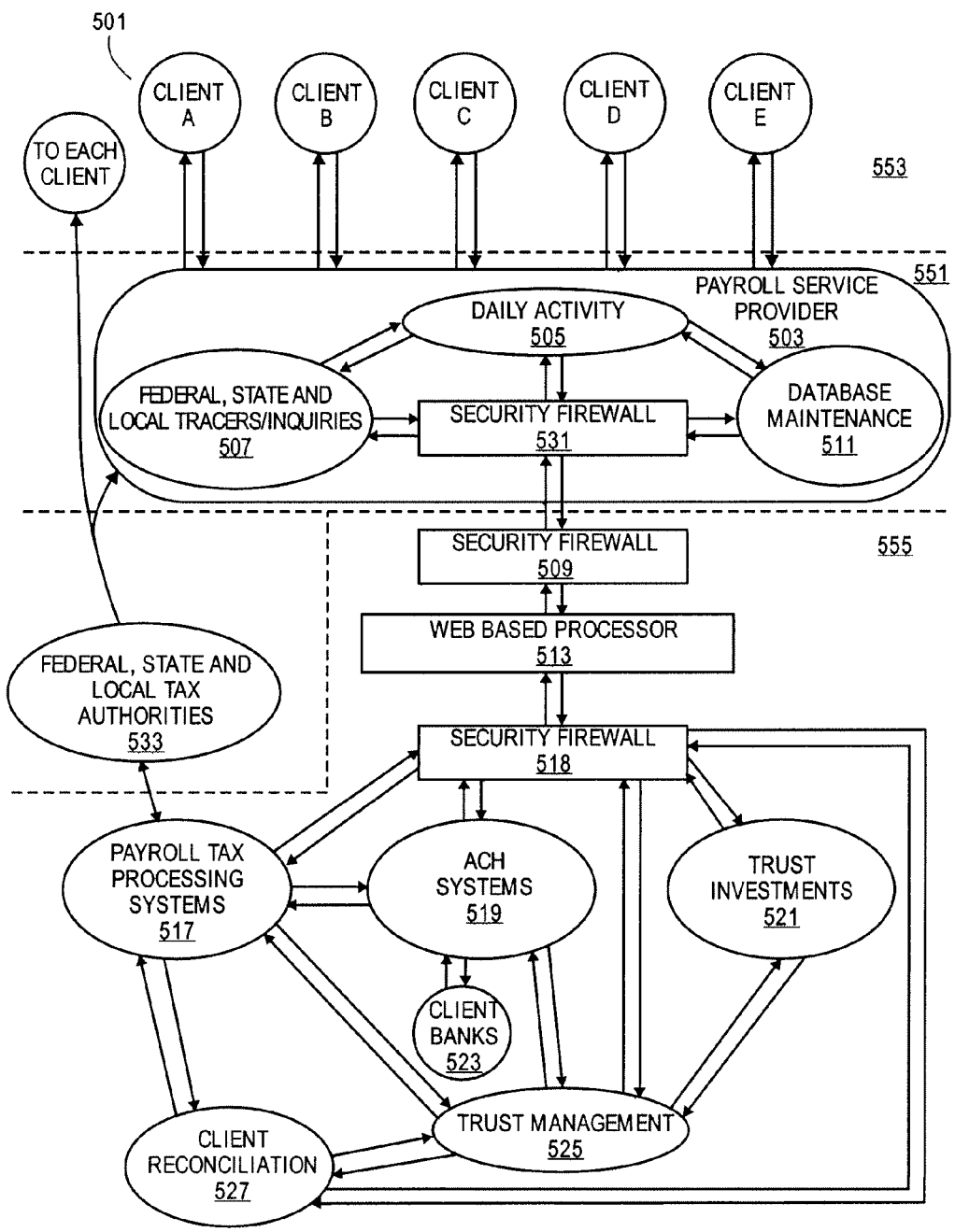
FIG. 5A is a diagram of a web-based payroll tax trust management processing and related services system.

FIG. 5A is a diagram of one embodiment of a secured hosted payroll tax trust management service. In this embodiment, the payroll tax trust system may be a system hosted by the payroll software developer or the vendor that is separate from the other systems of the payroll service provider 503. The payroll tax trust management system 555 may host accounts for multiple payroll service providers 503 for sake of convenience, the example of a single payroll service provider system 503 is used herein. The payroll service provider 503 may have a separate payroll software system 551 that interacts and receives data from a set of clients 501, each having their own method of providing required data to process a payroll for the client. The interaction and exchange of information between the clients 501 and payroll service provider 503 may be through electronic data services, telephonic communication, intranets, internets, or similar communication mediums for transmitting data or other methods of exchanging information. Communication between client 501 and payroll provider system 503 may use encryption such as Rivest-Shamir-Adelmar (RSA), Pretty Good Privacy (PGP), Data Encryption Standard (DES), Secured Socket Layer (SSL), or similar encryption tools. In one embodiment, the payroll service provider 503 may be primarily responsible for processing and handling payroll data for clients 501. The payroll service provider 503 may use a third party payroll software product for providing payroll processing service and related services or may use its own proprietary payroll software system. In one embodiment, the payroll service provider 503 may be a payroll vendor, end user or client, a payroll service organization, payroll employment organization (PEO) or any other payroll related service company. In further embodiments, a payroll service provider 503 encompasses the payroll software developer or software developer of other applications incorporating or supporting some facet of payroll processing (e.g., human resources software and time and attendance software), payroll service consultants or administrators or similar individuals that assist in the management of payroll processing, independent sales organizations (ISOs) that sell or support payroll related services and similar entities providing support or direct services related to payroll management or payroll payment distributions.

The hosted system 555 may be capable of attending to and administering the complex roles and regulations of all federal, state and local payroll tax codes, maintain a correct balance of all clients payroll tax funs held in trust, reconcile these client payroll tax trust funds on a systematic basis, maintain strict policies to prevent any co-mingling of client payroll tax funds with company funds, provide appropriate banking controls over the movement of these client tax funds, invest excess client trust funds conservatively and prudently, require independent audits of these client tax trust funds, require independent systems control audits, have bonding for fiduciary responsibilities for the protection of the client assets and provide similar services and procedures for administering a tax trust management processing system. These services and controls are provided to the payroll service provider while allowing the payroll service provider to maintain control over client accounts and the data required to generate the files submitted to the hosted system 555.

In one embodiment, the hosted system 555 may communicate with the payroll provider 503 system 551 through any electronic communication system, telephonic system, intranet, internet, or similar communication medium. The communication between the payroll service provider 503 and the hosted payroll tax system 555 may be in the form of daily activity processing 505. Daily activity processing 505 may include updates of client information, payroll data, tax information and similar information related to the processing of payroll taxes and payroll services. Payroll service provider 503 may generate daily activity using its own internal software systems, third party systems or vendor provided systems. Daily activity 505 may include updates to client information, payroll data and similar information. The payroll service provider 503 may also generate database maintenance information 511 such as updates to client information and payroll and tax information. The payroll service provider 503 may also generate responses to tax agency tracers/inquiries 507 for federal state and local tax authorities. These tracers/inquiries 507 are requests for information on the status of tax related issues such as payments, notices, and corrections to tax payments and filings. Payroll service provider 503 may regulate access and control of each of these internal services, daily activity 505, database maintenance 511 and federal, state, and local tracers/inquiries 507, based on user experience, seniority, position, or similar characteristics of the employees or users at the payroll service provider 503.

In one embodiment, the daily activity 505, database maintenance data 511 and tracer inquires 507 may be sent to a web-based processor 513 managed by the vendor system 555. Data provided by the payroll service provider may be provided in a batch file, CMF or similar format to vendor system 555. As used herein, a batch file may refer to any grouping of data in files or similar organizations or groupings of data. This data may be protected using Rivest-Shamir-Adelmar (RSA), Pretty Good Privacy (PGP), Data Encryption Standard (DES), Secured Socket Layer (SSL), or similar encryption tools. This data may be double encrypted in its route to the web-based processor 513. The payroll service provider and hosted system 555 may each maintain a set of security firewalls 531, 509 that prevent inappropriate access to each of the systems 551 and 555. Security firewalls 531, 509 may utilize standard technology based networking, firewall and similar firewall technology. In addition, security firewall 509 may include security measures adapted by each of the payroll service provider and host 555. This may include restricting the access to information, machines and locations of each of the payroll service provider 503 and host (e.g., software developer). The payroll tax trust management system may incorporate an implementation of the American Institute of Certified Public Accountants (AICPA) Statement of Auditing Standards (SAS) SAS No. 70 level I or level II. This provides a fully secured environment that has been independently audited to meet or exceed the standards of the industry.

The web-based processor 513 receives the information and data provided by the payroll service provider 503 and processes this data to update the systems of the vendor 555. The web-based processor may be a server, set of servers, applications and similar resources in communication with the payroll service provider 503 and other vendor resources. In one embodiment, the web-based processor 513 may be a set of web servers, authorization or certification servers and similar resources. The web-based processor 513 may be in communication with the Internet, or part of an intranet, internet or similar system. This may include parsing or interpreting incoming data, updating local databases and generating communications for other subsystems of the vendor system 555 based on the incoming information from the payroll service provider 503. The web-based processor 513 may execute a web server program, set of application server or similar infrastructure for receiving and processing data over an internet or similar communication medium. The web base processor manages 513 the handling of incoming data from the payroll service provider 503 such as the incoming daily activity data 505, database maintenance information 511 and tracers/inquiries 507.

In this manner, the payroll service provider 503 maintains complete control of the management of data hosted by vendor service 555. In addition, the payroll service provider 503 may query or similarly request information stored by or managed by the web-based processor 513. Updating and viewing data stored or processed by the web base processor 513 may be restricted according to the user level, administration level, seniority level or similar criteria of the individual associated with the payroll service provider 503 that attempts to view or update the data. In one embodiment, the web-based processor 513 provides a web-based interface for payroll service provider 503 to access and interact with the hosted data. The payroll service provider 503 may upload the data generated by its systems and download or modify data managed by the web-based processor 513. In this manner, the payroll service provider 503 maintains complete control over the contents of data serviced by the web-based processor 513 and vendor service system 555.

The vendor system 555 may maintain two sets of data in the hosted system. The first set of data may be accessible through the web processor 513. The first set of data may be updated as new incoming data is received from a payroll processing system 551. This data set may be accessible and modifiable by the payroll service provider 503. The second set of data may be maintained by the vendor system 555 in the payroll tax processing system 517. In other embodiments, the second subset of data would also include other subsystems of the vendor system 555 such as other facets of the trust management system, ACH systems 519 and similar systems. This system 517 may be separated from the web-based processor 513 by a firewall providing an additional level of security to protect it from tampering and hacking. This second data set may be stored and managed by a set of servers and database management systems. In one embodiment, the second set of data may be managed by a set of Sun System 5 databases, Sun System 5 Application servers, citrix Presentation servers, load balancing software and similar resources. Data provided by payroll processor 503 may be separately cached or stored at the web-based processor 513 to be periodically updated into the second data set.

The payroll service provider 503 may utilize the features and tools provided by the web-based processor 513 to access or direct the use of other services provided by the vendor such as payroll tax processing system 517, ACH systems 519, trust investments 521, trust management 525 and client reconciliation 527. This payroll tax trust management service hosting system 555 may be utilized with any of the other vendor provider resources described herein including the risk management system, ACH processing, bulk filing, employee paycard, NSF protection systems and other similar systems. In one embodiment, the payroll tax processing system 517 provided by the vendor system 555 may interact with the web-based processor 513 to generate filings for federal, state and local tax authorities 533. Payroll tax processing system 517 may interact with the ACH system 519 or may utilize other payment mechanisms to generate the appropriate deposits and credits necessary for processing federal, state and local tax obligations.

In addition, the ACH system 519 may interact with the client banks 523 of payroll service providers 503 to provide funding for the ACH transactions generated by the payroll tax processing system 517. The web-based processor 513 may issue instructions for updates requested by the payroll service provider 503 directly to the trust investment system 521, trust management system 525, and client reconciliation system 527. Trust investment system 521, trust management system 525 and client reconciliation system 527 are also all in communication with the web-based processor 513 through security firewall 515. Security wall 515 may be composed of a set of technology based security firewalls such as standard networking based firewalls, as well as SAS No. 70 security compliant measures, ISA 2004 compliant measures and similar security measures.

Payroll tax processing system 517 may also have access to the information in the trust management system 525 and client reconciliation system 527. Trust investment system 521 and trust management system 525 may be fully integrated into the client tax accounts and provide automated reconciliation through the client reconciliation program 527. The web-based processor 513 may interact with these systems to generate web-based detailed balance and account statements for each client. The hosted payroll tax system reduces the overall processing and maintenance costs for the payroll service provider. The vendor system also allows payroll service provider 503 to maximize the utilization of the trust investment 521 and management systems 525 via a seamless integration with the trust management and trust investments systems 521 to improve the revenue stream, reduce costs, reconcile accounts and simplify management of accounts. In one embodiment, the trust management 525 incorporates or facilitates both the handling of the trust funds and the administration of the funds in related systems (e.g., tax system, IRA subsystem, ACH system, garnishment subsystem or similar systems). In another embodiment, the trust management system 525 is restricted to the handling of the trust funds and the administration of the funds is handled external to the vendor system 555.

In addition, the vendor system 555 provides bonding as part of the overall tax payroll hosting service. Normally, payroll service providers 503 may have to obtain their own bonding for each jurisdiction in which they need to process federal, state, and local taxes. The hosted payroll tax processing system relieves the payroll service provider of this burden by providing bonding for each jurisdiction. The bonding coverage may cover owners, officers and employees and current governmental coverage requirements, future requirements, or proposed requirements. Bonding may be obtained from a bonding company or similar institution.

In cases where federal, state and local tax authorities generate and send corrections, queries, assessments or similar communication to clients and payroll service providers, the payroll service provider 503 may generate responses and send responses to the vendor system 555. These trace inquiries may be processed by the web-based processor 513 and passed on to the payroll tax processing system 517. Federal, state, and local tax authorities 533 may send notice and similar information directly to clients 501, payroll service provider 551 or back to the payroll tax processing system 517. Notices and data sent to client and provider 503 may be introduced to the vendor system 555 through the web-based processor 513. Notice and information returned to the payroll tax processing system may be passed on to or made available to the payroll service provider 503 via the web-based processor 513.

Additional services and features supported by the hosted payroll tax management service may include company, corporate and individual loan programs, certified accounting audits, and consulting services for company and corporate loan programs that may provide options to access working capital, support sales, marketing and acquisitions and generation of market evaluations. Personal loan programs may be utilized to lend to owners, directors, officers, management, or employees. Certified accounting audit programs may include tax trust auditing, may be performed by independent auditors and may be used to generate annual audit reports. Consulting services may include legal consulting, banking consulting and revenue consulting. A vendor may obtain improved revenues by offering these services that are integrated or compatible with the hosted tax processing system.

Figure 5B:
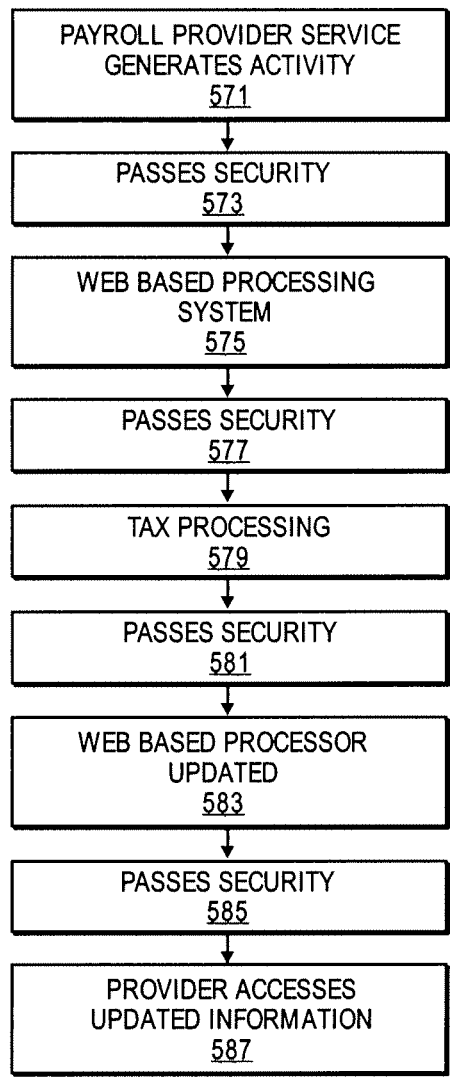
FIG. 5B is a flow chart of the operation of a web-based payroll tax trust management processing and related services system.

FIG. 5B is the flow chart of one embodiment of a hosted payroll tax trust management service. In one embodiment, the payroll provider generates daily activity, database maintenance data or federal, state or local tracer inquiries using an in house, third party or vendor system (block 571). The payroll service provider then transmits the generated activity through security (block 573). Security may be a set of security firewalls on a network communication medium and complimentary security measures such as those measures required to meet the SAS No. 70 audit at level I or II. The provider may have a firewall and similar security measures and the vendor system may have a separate firewall and set of security measures.

The data received from the payroll provider is processed by the web-based processing system (block 575). This may include updating databases and parsing incoming information to be forwarded to other vendor provider resources. The web-based processor and related resources may maintain separate duplicate data sets for client account and similar information. One set may be accessible over a network or similar medium. The other set may not be accessible and used as a source for other resources or processes in the vendor system. The second data set is thereby protected from unauthorized access or hacking. Incoming data may automatically update the first set of data. The second set may be updated periodically under secured or verified condition. Data being provided to other vendor provider resources passes additional security (block 577). Additional security may be the same or a different set of networking firewalls and complimentary security procedures that separate the web-based processor from the other vendor resources. In one embodiment, the additional resources receiving the data may include a tax processing system where the data from the web-based processing is provided to the tax processing system to generate tax filings and payments (block 579).

After incoming data is processed, return information, confirmation or similar data may be returned to the web-based processor through security (block 581). The web-based processor uses the return information to update the first and second data sets (block 583). The data available on the web-based processor may be separated from the data stored and managed by the other resources of the vendor provided system. In this manner, the hosted payroll tax manager service provides information to the payroll service provider without endangering or exposing the data and other resources to tampering or hacking. The data provided through the web-based processor may be maintained along with a duplicate set of data. The duplicate set of data may be used to allow viewing of current data by the provider service while the original set of data is relied on for actual processing by the other services. The web-based processor thereby maintains a mirror of the actual data as an additional security measure. A hacker or similar threat may alter the duplicate data but the original data is secure. The provider may access updated information from the web-based server through security firewall (block 585) to view or monitor the processing of data (block 587).

Referring again to FIG. 2, after system 200 completes risk management analysis, then all payroll tax transactions, ACH only transactions 213 and non-tax payroll transaction data 215 are processed by the customized ACH processing system 217. Data input into system 200 other than that typically needed for a payroll system may be provided in a single batch, as opposed to multiple batches. In one embodiment, a client may provide only that data which is typically provided per industry ACH standards.

Customized processing 217 moves all funds required to be processed as scheduled. Upon receipt of verified CMF and transaction file data the movement of funds is initiated through the ACH banking system. However, certain clients may be placed on a warehousing status. The funds to be transferred (i.e., the debit to the client) will then be held for a day or two and processed at the time requested by the client or an agent of the client. Credit transactions can be warehoused and may be distributed based upon the date established by the vendor 205, the client 201, 203 or by government regulation. Credit transactions may additionally be received from other agencies or companies. The warehouse will reject those items not scheduled to be received for processing. This may require vendor 205 or client 201, 203 action to approve further action or correct transaction data. Customized ACH transaction processing software 217 may run on a single server or be distributed over multiple servers. Customized processing system 217 may communicate with ACH banking serving via a network, dial-up connection, or similar communication method.

Banks used by a vendor, client, or beneficiary must have a capability of receiving and properly posting an ACH item generated by system 200. Vendor 205 or client 201, 203 may have trust accounts in a bank account authorized and maintained by system 200 provider.

Figure 6:
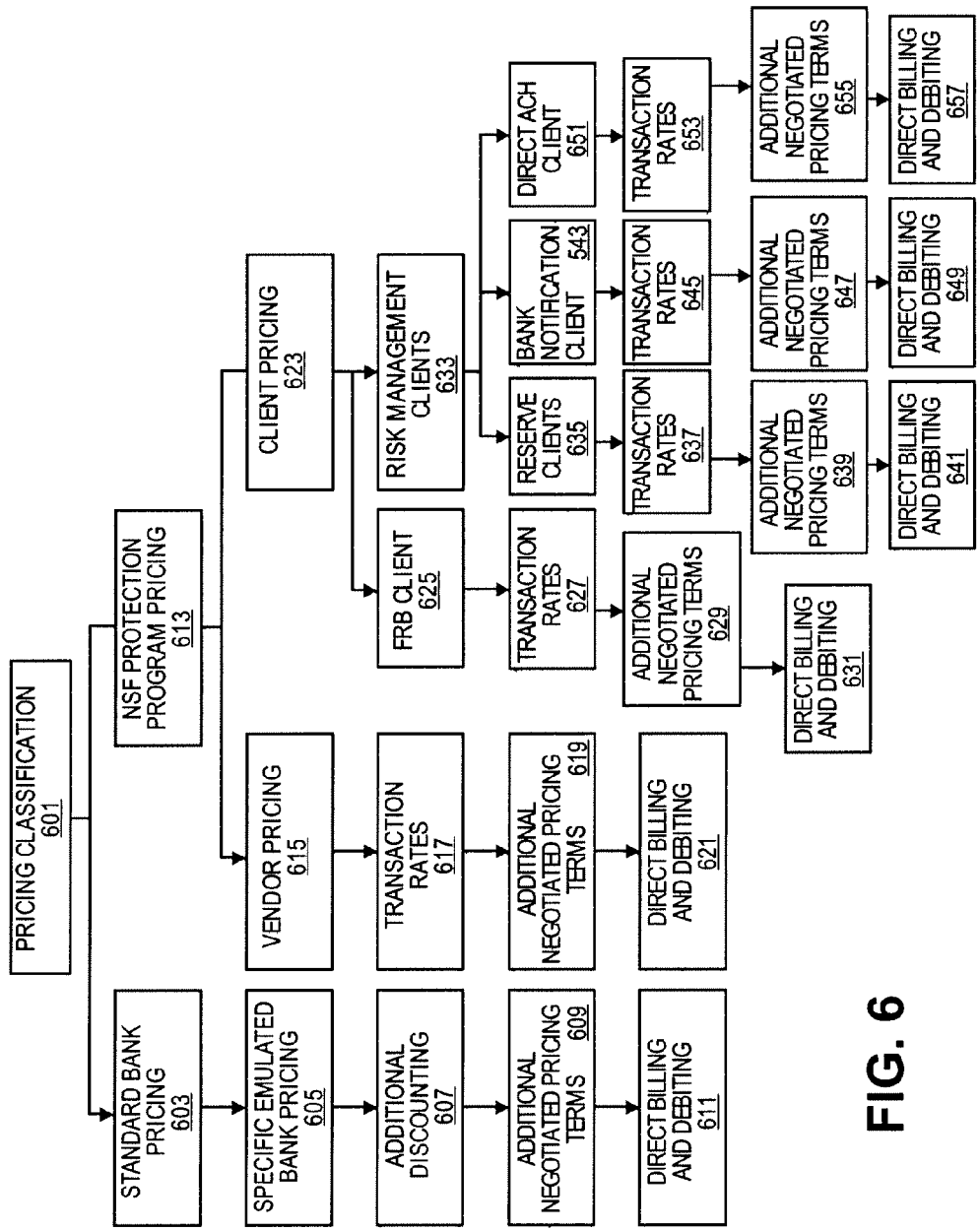
FIG. 6 is a diagram of a pricing classification system.

FIG. 6 is a diagram of a pricing classification system (block 601). This system is used to categorize each client 201, 203 and vendor 205. In order to determine the proper classification for a client 201, 203 or vendor 205, it is determined if an NSF protection plan is applicable. If an NSF plan is not applicable, then a standard pricing classification is used (block 603). The standard pricing classification is based on general practices of banking institutions. Rates and fees are determined based on industry standards. The standard pricing classification can be further modified to emulate the transaction rates and practice of a specific institution (block 605). Specific discounts programs may also be used to modify the standard pricing classification (block 605). Additional pricing terms and rates to modify the standard pricing classification may be negotiated with service provider (block 609). The standard pricing classification and modified forms of the classification allow for direct billing and ACH debiting from a client 201, 203 or vendor 205 account (block 611).

NSF plans may be an alternative to the standard pricing classification (block 613). NSF plans may be divided between vendor 205 and client 201, 203 classifications. Vendor billing (block 615) may include standard fees including fees based on clients per month, minimum charges, file correction charges and similar fees (block 617). Modification of the standard NSF vendor pricing may be negotiated with the service provider (block 619). Standard NSF vendor pricing allows for direct billing and ACH debiting from a vendor account.

Client billing classifications (block 623) are divided between federal reserve bank (FRB) clients (block 325) and risk management clients (block 633). FRB clients are charged a set of transactions and service fees based on files per cycle, number of transactions, minimum per file charges and similar fees (block 627). The FRB client pricing classification may be further modified based on negotiations with a service provider (block 629). The FRB client pricing classification allows for direct client billing and ACH debiting of a client's account (block 631).

Risk management clients are further subdivided into reserve clients (block 635), bank notification clients (block 643) and direct ACH clients (block 651). Reserve clients maintain cash reserves as defined by a service provider. Reserve clients may also have a guarantee from their bank, vendor 250 or third parties. Risk management clients have an applicable transaction rate schedule similar to FRB clients (block 637). Additional terms or modifications may be negotiated with the service provider (block 639). Reserve client classification allows for direct client billing and ACH debiting of a client's account (block 641).

Bank notification and direct ACH clients (blocks 643, 651) also have applicable transaction rate schedules. These rates may be greater, including three times greater than reserve or FRB clients due to increased risk for the service provider (blocks 645, 653). Additional terms or modification of these classifications may be negotiated with the service provider (blocks 647, 655). These classifications allow for direct client billing and ACH debiting of a client's account (blocks 649, 657).

Figure 7:
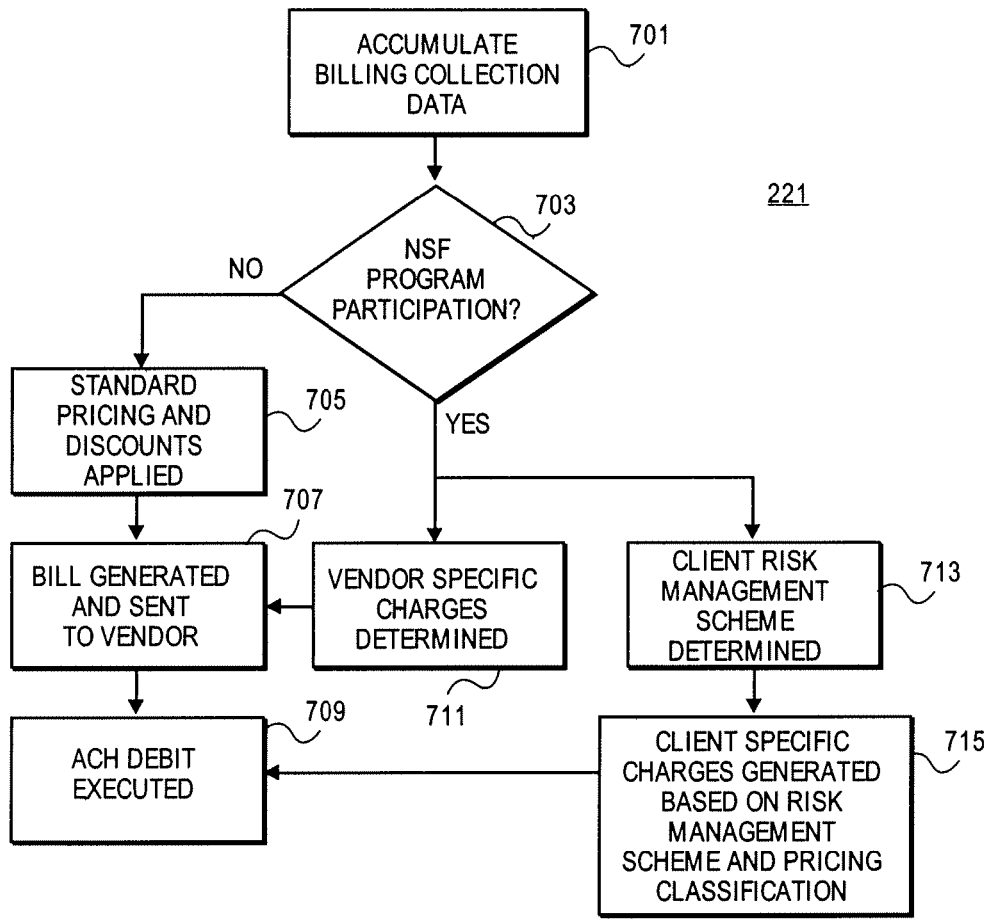
FIG. 7 is a flow chart of a collections processing system.

FIG. 7 is a flow chart of a collections system 221. Settings of collections system 221 may be accessed and altered by the vendor 205 or service provider through a web-based interface application or similar interface. Collections system 221 accumulates billing data from incoming batch transaction file data and is provided data from SRB system 207, ACH processing system 217, tax system 211 and similar data sources (block 701). This data is used to determine the pricing classification for each client 201, 203 and vendor 205, as shown in FIG. 6. Collections system 221 determines if each client or vendor participates in an NSF program (block 703). If the clients 201, 203 and vendor 205 do not participate then a standard pricing and discounting scheme is applied to the transactions performed for the client 201, 203 or vendor 205 according to the pricing classification (block 705). A bill is then generated and sent to the vendor 205 via a web interface, electronic messaging or by mailing of a printed document (block 707). In one embodiment, the total owed by the vendor 205 or client 201, 203 is automatically directly debited by ACH transaction (block 709). All transactions including ACH transaction tax payments and billing for a desired period may be combined in a single ACH debit transaction for each client 201, 203 and vendor 205.

If a client 201, 203 or vendor 205 does participate in an NSF protection program then vendor specific charges may be determined separately according to the pricing classification for the vendor 250 (block 611). A bill (block 707) and direct debit (block 709) are then generated by collections system 221. The risk management scheme for each client is determined, if applicable, depending on the pricing classification of each client (block 713). Client specific billing is generated according to the applicable risk management scheme and pricing classification (block 715). The total owed by the client 201, 203 is automatically debited by ACH transaction (block 709). All transactions including the payments, ACH transactions and billing for a desired period may be combined in a single ACH transaction for each client 201, 203. Debit transactions having the same settlement date and bank account may be combined.

In one embodiment, system 200 includes a trust management accounting system 225. Trust management system 225 may run on a server with system 200 or on a separate server in communication via network or dial-up connection with system 200 server. Clients 201, 203 or vendors 205 may maintain transactional balances with trust management system 225. In another embodiment, clients 201, 203 or vendors 205 may maintain an accounting structure for their trust balances. The trust management system 225 functions as a demand deposit accounting system (DDA) that maintains deposit and disbursement activity for each client, vendor or other entity that has processed transaction activity through trust system 225 and requires balance forward accounting services. In one embodiment, trust management system 225 is a double entry accounting system.

Transaction data regarding the management of trusts is provided by the ACH transaction processing systems 217. Trust management system 225 maintains a complete and accurate ledger balance and activity on behalf of each client 201, 203 and vendor 205. Trust management system 225 generates periodic reports to clients 201, 203 and vendors 205 regarding the clients' overall activity within the trust account established for each client 201, 203 and vendor 205. Reports may be accessed via a web-based interface or printed and sent to clients 201, 203 and vendor 205. Trust management system 225 provides each client and vendor monthly or quarterly statements, as established for each when installed. Vendor 205 or client 201, 203 may manage or maintain their trust account through a web-based interface, software application or similar application via a network such as the Internet or dial-up connection.

Trust management services 225 mirror control account processing, or money market accounts. Trust management services 225 functions similar to a bank checking account with limitations, which may vary. In one embodiment a limitation may be placed on the payee, namely that all checks or transfers of funds may be made to only taxing authorities or other pre-approved payees.

Each trust account is held in the name of the system 200 provider. A sub-account may be in the name of the vendor 205 or client 201, 203. Deposits to the account will typically be made through ACH transactions. Disbursements will also typically be made through ACH transactions. The trust account may be balanced by the individual client 201, 203, vendor 205 or other entity as may be necessitated.

System 200 includes an investment accounting and forecasting system 229. The trust account balances, as well as other related data, are forwarded by system 200 to the trust fund investment subsystem 229. Investment and forecasting system 229 may run on system 200 server or a separate server in communication with the system 200 server. The investment system 229 maintains a history of each client's trust balance, including tracking of payroll, payroll tax and similar fund accounting. The forecasting and projecting of available funds for investing purposes, other than the typical day to day "bank" account investment includes the history of balances which is based upon current client 201, 203 or vendor 205 payroll system and current schedules of potential incoming and outgoing funds which are based on an expected client growth factor supplied by the vendor 205. At the option of the vendor 205, the forecasting module shall provide historical data reporting which measures month to month and quarter to quarter balances on a "this year" versus "last year" basis. The module also produces balances solely on a current month versus last month basis or other reporting data as may be required.

Vendor 205 or client 201, 203 are offered various investment options through investment system 229. These investment options will range from the percentage of investable funds in major investment categories to the allocation of different types of investments: extremely secure, very secure, secure; daily, weekly, monthly, quarterly, annually; amounts not to exceed certain ranges or maximums; and a base minimum that will never be invested, but will be maintained as liquid. This liquidity factor will always be maintained as a fall back amount for the sole purpose of having funds available for any emergency. The vendor 205 or client 201, 203 will additionally have control over where the investment is made, in what entity or type of security the available funds are invested. In one embodiment, vendor 205 or client 201, 203 can select investment options and manage balance through a web-based interface, specialized software application or similar application via a network such as the Internet or via dial-up connection.

The vendor selects the "outline" for the authorized investment and the subsystem 229 makes the required and designated investments in the percentages and time frames, as previously approved. The investments are based upon the best available option for the period in time that the funds are available or are forecasted as available. These funds may be invested with and through leading financial firms.

System 200 supports a payment card system 227. A separate software module processes more detailed payroll data. One of the processing tasks of this module is the handling of the paycard subsystem 227. A vendor 205 provides the pay card system 227 with the specific payroll data required to process this application. The payroll data is based upon data made available to the vendor 205 by the client 201, 203 or client's employee.

The paycard system 227 automatically posts the earnings of a client's employee to a system 200 account established in the employee's name. This may be the net amount of the employee's paycheck or it may be an amount deducted from the employee's gross and designated to be forwarded to the employee's payment card account. The employee will be issued a payment card and may use it at their discretion to pay for items against their account as long as the employee has sufficient funds available. The employee's funds are held in a trust account and maintained individually by the paycard system 227. The employee will receive standard or similar reports that are available in the marketplace.

Other deposits and disbursements 223 that the system 200 processes include: IRA deposits, 401(k) program deposits, 125 California plan, Cafeteria plan deposits, worker's compensation payments or programs, group health benefit disbursements, and similar scheduled payroll based calculated items that can be inventoried or warehoused for payment on a timely basis. These funds will also be accounted for in a trust system on behalf of the employee or client. In one embodiment, the trust fund accounts are transferred to the investment forecasting subsystem for investment. In one embodiment, these funds are managed entirely by, and for, the exclusive benefit of the system 200 provider. Such investments would be inline with industry standards.

In one embodiment, additional subsystems for managing disbursements or transactions may be included in the system 200. These additional subsystems include an IRA management subsystem that facilitates the administration and disbursements related to IRA accounts of employees. Similar subsystems may be utilized for the administrations and processing of 401(k) plans, 125 California plans, Cafeteria plans, workers compensation programs, garnishment programs, group health benefit plans, unemployment consulting and similar payroll and disbursement plans. Each of these components may be modular and added to or made available to clients and payroll service providers individually or in any combination.

Figure 8:
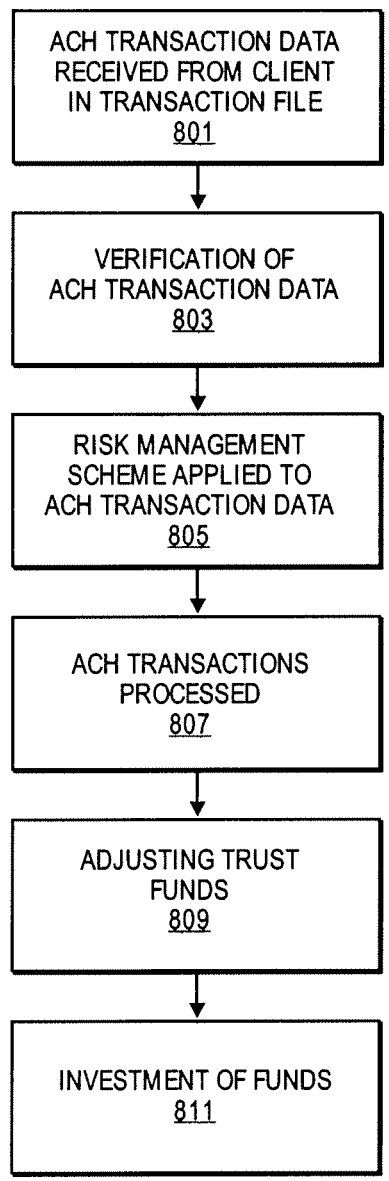
FIG. 8 is a flow chart of transaction processing in the automated system.

FIG. 8 is a flow chart showing the processing of a transaction file in automated system 200. Transaction data including ACH transactions are received by system 200 from a vendor 205 or client 201, 203 (block 801). The transaction file may be in a specified format. The transaction file may be received via a web interface, over a network, through a dial-up connection or through a similar system. After the data is received, it is checked and verified by the SRB system 207 (block 803). If verification or corrected data is required, then system 200 awaits client 201, 203 or vendor 205 input.

After SRB system 207 completes system 200 applies the appropriate risk management scheme in the risk management system 210 (block 805). After the requirements of the applicable risk management scheme have been met, then the ACH transactions are processed by system 200 (block 807).

In coordination with the appropriate risk management scheme and ACH transaction processing, client trust account balances are adjusted (block 809). Clients may also wire or provide additional funds to system 200 that are kept in trust. When trust fund balances meet threshold requirements, additional funds may be invested (block 811). This investment system 229 forecasts future available funds and invests surplus funds appropriately.

In another embodiment, subsystems and services including payroll tax system 211, trust management system 225, investment and forecasting system 229, bulk filing system 219, paycard system 227, bonding services, tax consulting, and collection system 221 may be used with standard ACH processing systems where multiple batch files for payroll transactions such as direct deposit, fee collection, agency checks, tax liability and similar transactions are submitted separately. The above mentioned systems and services may be used in any combination to process or manage the individual or combined batch files.

Figure 9:
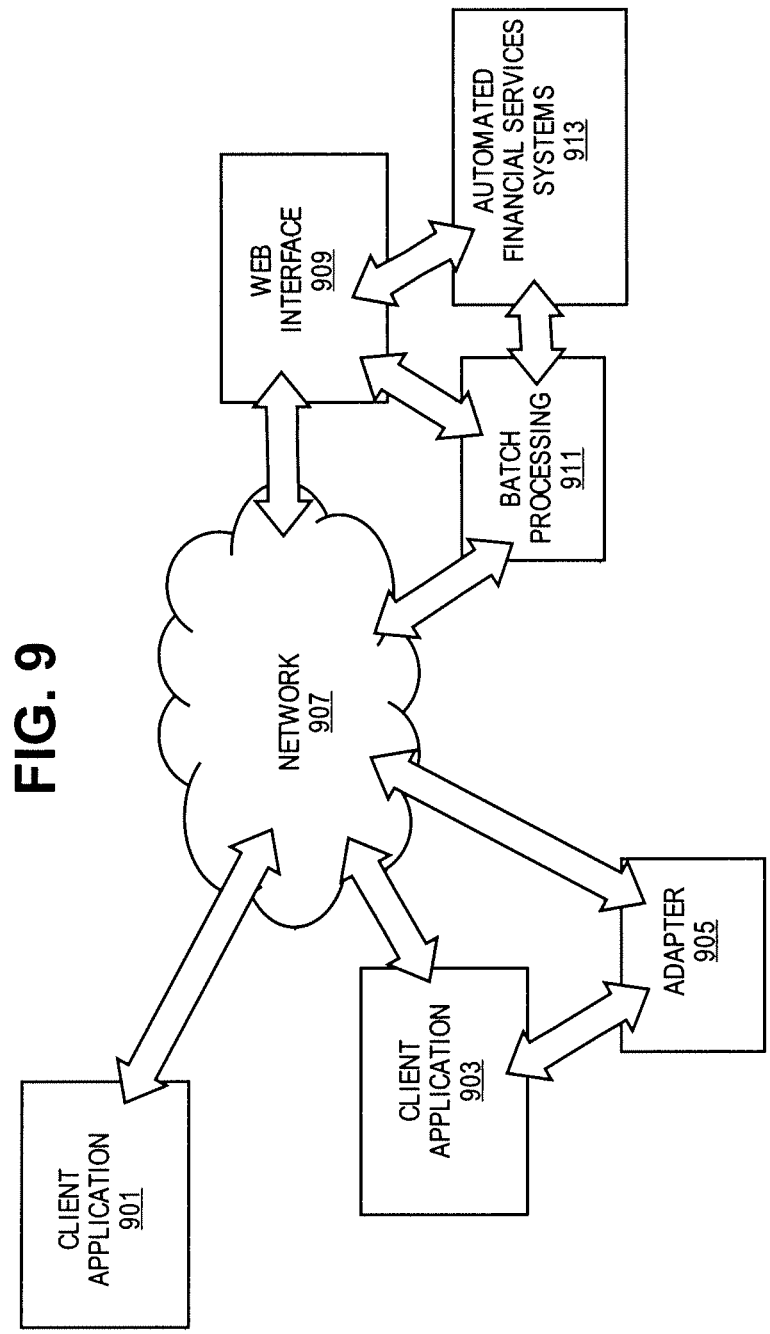
FIG. 9 is a diagram of one embodiment of the batch file handling system.

FIG. 9 is a diagram of one embodiment of the batch file handling system. In one embodiment, the automated financial services system, such as the automated financial transaction system 200, may include a component for generating and processing files from payroll processing providers or end users. The batch file processing system sits between or is integrated into the client applications utilized by payroll processing providers or end users and the automated financial services system to facilitate the movement of data between the automated financial services system and client applications. The batch file processing system may process received files prior to an SRB system or it may be integrated with the SRB system.

In one embodiment, the batch file handling system relies on receiving batch files that meet the requirements of a specification. The specification is determined by the automated financial service provider. The specification may be implemented by the software of a payroll vendor or end user or a through a software adaptor that is provided by the automated financial service provider or a third party. The specification may be updated periodically. The update of the specification may be manually or automatically implemented. A modified software adaptor can be provided or a specification can be downloaded from a site provided by the automated financial services provider and automatically incorporated by the software adaptor or client application.

The batch file handling system allows for initial error checking including gross check management, client check management, ACH account activity error checking, tax account activity error checking and similar data accuracy and coherency checks. These checks are enabled by use of a standardized format for receiving data by the automated financial services system. The specification requires that the records and data necessary for these checks are included with the batch file allowing for easy checks of the data against the databases of the automated financial services system.

The system may interact with a set of client applications 901, 903. The client applications 901, 903 may be payroll processing applications or similar programs operated by payroll vendors or end users. These client applications 901, 903 are executed or hosted by a server, workstation or similar set of machines belonging to the payroll processor or end user. Any number of client applications can interact with the automated financial services system. These client applications 901, 903 may transmit data to the automated financial services system directly over a network 907 or through an adapter 905. The network 907 may be any type of public or private network. The network may be a local area network (LAN), a wide area network (WAN), such as the Internet, or a similar network.

In one embodiment, the software adapter 905 of the batch file handling system is a stand alone application that interfaces with the client application. The adapter 905 may be hosted by the payroll provider or the automated financial services provider. In another embodiment, the adapter 905 is a plug-in or similar program provided by the automated services provider that is compatible with the client application.

The adapter 905 operates in response to a request of the client application 903. The adapter 905 receives or retrieves a set of files specifying a set of transactions such as payroll tax transactions, ACH transactions, IRA transactions or similar types of transactions. The adapter 905 generates a batch file according to the specification designated by the automated financial services provider. The adapter 905 may require that necessary files are provided or may automatically retrieve or similarly interact with the client application 903 to obtain the necessary information. Table I is an example format for a batch file.

TABLE I

| Batch/Level | | Description |
| --- | --- | --- |
| Payroll Processor Header Section | | |
| Payroll Processor | Header Record | One record per file |
| | Address Record | One record this section |
| | Contact Record(s) | One or more records |
| | Bank Acct. Records(s) | One or more records |
| Payroll Processor Detail Section | | |
| Payroll Client Header Section | | One group for each client per file; repeat the group as needed |
| Payroll Client | Header Record | One record per client section |
| | Address Record | One record this section |
| | Contact Record(s) | One or more records |
| | Bank Acct. Records(s) | One or more records |
| | Tax Records (Client Wage Totals) | One or more records |
| | Tax Records (Employee Contact) | One or more records |

TABLE I-continued

| Batch/Level | | Description |
| --- | --- | --- |
| | Tax Records (Employee Wage Totals) | One or more records |
| | ACH Company/Batch Header Record | One per Batch |
| | ACH Detail Data | Multiple records per batch |
| | ACH Company/Batch Control Record | One per batch |
| Payroll Client Trailer Section | | |
| Payroll Client | Client Trailer Record | One record per client section |
| Payroll Processor Trailer Section | | |
| Payroll Processor | Trailer Record | One record per file |

In one embodiment, the batch file is divided into sections and sub-divided into records for each section. The batch file sections divide payroll processor data from payroll client data. The size and number of records in each section varies dependent on the number of clients for a payroll processor and the number and types of transactions for each payroll processor or client. The batch file organization in Table I is an example format that requires a set order of files and requires the presence of certain files. One skilled in the art would understand that other organizations of batch files are contemplated that are consistent with the principles discussed herein, including batch files that do not have set requirements or have flexible or configurable requirements for the order or content of the batch file.

In one embodiment, the adapter 905 returns the generated batch file to the client application 903. The client application 903 or similar application, such as a general purpose web browser is then used to submit the batch file to the automated financial services provider. In another embodiment, the adapter 905 automatically forwards the batch file to the automated financial services provider upon generation of the batch file, upon direction from the client application or under similar circumstances.

In one embodiment, the automated financial service provider provides a web-based interface 909 for receiving batch files and similar information from a client application. The web-based interface 909 may be a website or similar interface to allow a payroll processor to submit and review batch files and receive information about the submitted transactions and accounts. The web-based interface 909 manages the transfer of data and the display of data to and from the automated financial services provider.

In one embodiment, the web-based interface 909 receives a batch file from the client application 903 and forwards it to the batch processing module 911 or the automated financial services system 913. The automated financial service system 913 in this diagram represents the other systems and components provided by the automated financial service provider. In another embodiment, the batch file is submitted directly to the batch processing module 911 or through another application, such as a file transfer program or similar application.

The batch processing module 911 examines the batch file and sends each of the files in the batch file to the appropriate subsystem of the automated financial services system 913. The batch processing module 911 performs the initial error checking including the gross check management, client check management, ACH account activity error checking, tax account activity error checking and similar data accuracy and coherency checks by parsing the file and examining each of the relevant records to make these determinations. The batch processing module 911 provides the results of the initial checks to the appropriate subsystems of the automated financial services systems and/or to the client application from which the batch file was received.

Figure 10:
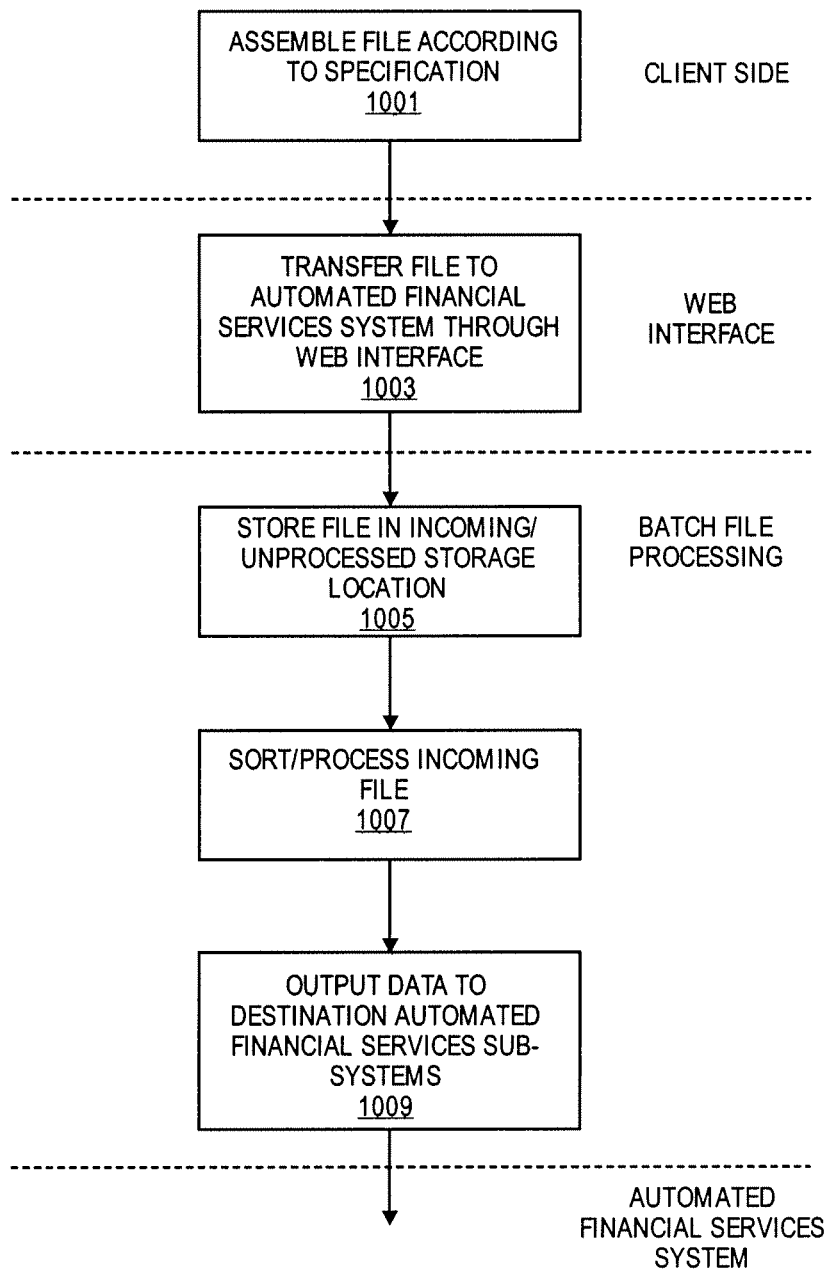
FIG. 10 is a flowchart of one embodiment of a process for generating and processing batch files.

FIG. 10 is a flowchart of one embodiment of a process for generating and processing batch files. In one embodiment, the process is initiated by the client application (block 1001). The client or the software adaptor assembles a batch file according to a specification. In one embodiment, the specification is hard coded into the client application or adaptor. In another embodiment, the specification can be dynamically updated by the client through a software update, over a network from the automated financial service provider or through a similar mechanism.

The batch file is then forwarded to the automated financial services system through a web interface (block 1003). A payroll services vendor or payroll client operating a client application logs into their account through the web interface and designates the batch file to be uploaded for processing. In another embodiment, the batch file is automatically uploaded to the batch file processing system by a software adaptor or the client application after the batch file has been generated.

The web interface provides the batch file to the batch file processing system. The batch file processing system stores the incoming batch file in an incoming or unprocessed batch file storage location (block 1005). The incoming batch file storage location can be any persistent storage device, server system memory or similar storage location. In one embodiment, the batch file processing system processes each batch file in the order received or according to a priority scheme. In another embodiment, the batch files are processed in parallel with one another.

Each received batch file is sorted and processed (block 1007). The records in each batch file are sorted according to the type of the records such as ACH transaction records, tax records, IRA related records and similar records are identified and forwarded to the respective processing modules, e.g., the ACH processing module, tax processing module, IRA processing module or similar modules.

The records are analyzed to determine a YTD gross check amount that is in the batch file or can be derived from the batch file. The YTD gross check amount is compared to the gross check YTD amount stored by the automated financial service provider to detect discrepancies between the two values. If a discrepancy is detected then a notice is generated to the payroll vendor or client.

The batch file processing system checks for new clients in the batch file that the automated financial service system has not handled before. A notification is sent to the client application of the payroll vendor to verify the new client and ensure that the data is not erroneous.

The batch file processing system checks each of the ACH transactions received in the batch file to ensure that their formatting is correct and can be processed. If an error is detected the client application is notified or the payroll vendor or client is notified through the web interface or similar communication mechanism. The batch file processing also generates a summary for each client that can be viewed through the web interface or client application.

The processed batch file data is then output to the respective destination automated financial services subsystems. In one embodiment, the records and files are forwarded to their destination subsystems as they are identified. In another embodiment, the records and files are sent to their respective subsystem in groups or packets.

Figure 11:
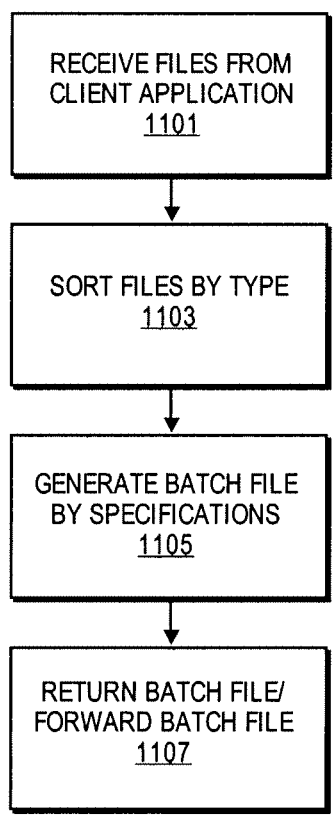
FIG. 11 is a flowchart of one embodiment of a process for generating the batch file.

FIG. 11 is a flowchart of one embodiment of a process for the operation of an adaptor. In one embodiment, the adaptor receives a request from the associated client application to generate a batch file. The adaptor then starts the process of retrieving the necessary files to create the batch file based on the specifications. In another embodiment, the client application provides the files to the software adaptor along with a request to alter the provided files to form a batch file according the specification for the automated financial services system (block 1001).

In one embodiment, the adaptor sorts the files it has received form the client application by the type of file. The file types are sorted to identify those types of files needed to generate the batch file according to the automated financial service system specification (block 1103). ACH files, tax files, IRA files and similar types of files are sorted. The sorted files are then placed into the batch file in the order required by the automated financial service system specification (block 1105). The files may be written into the batch file in the order specified or the files and associated data may be written into locations in the file designated for the types of files or records specified. Meta-data associated with the files placed into the batch can also be generated and written into the file. Meta-data can include information about the number of each of the records in the file, the types of records in the file, information identifying the payroll vendor, payroll client, the accounts of the vendor or client with the automated financial services provider or similar data.

A check may be made to ensure that each of the required fields of the batch file according to the specification has been fulfilled. If required data is missing it is requested from the client application or similarly requested. If the data is unavailable then an error is generated and the generation of the batch file may be aborted.

After the batch file has been completed by the adaptor, then the file is returned to the client application (block 1107). In another embodiment, the software adaptor automatically forwards the batch file to the automated financial service provider. The adaptor may use a specialized communication component, a file transfer application or similar uploading module to transfer the batch file to the servers of the automated financial services provider and the batch processing module the provider.

Figure 12:
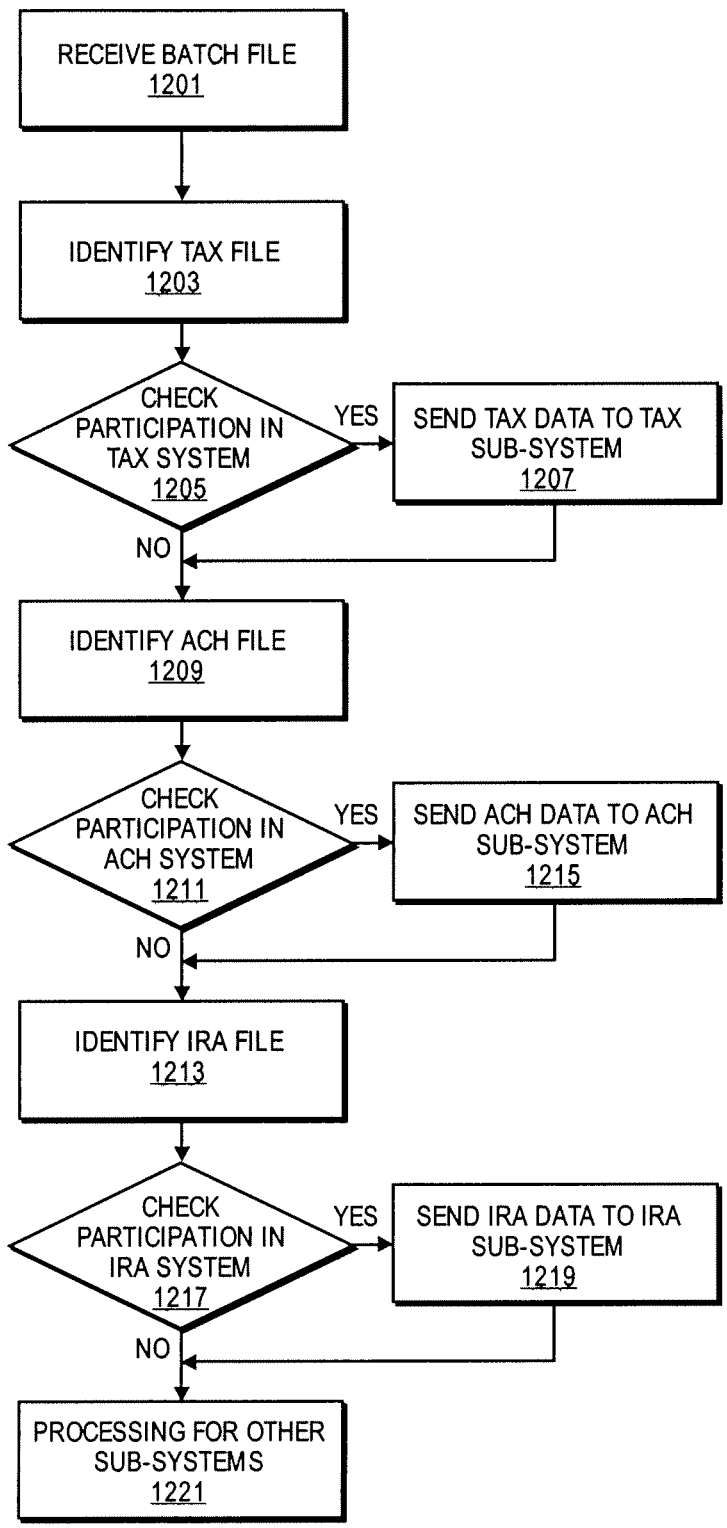
FIG. 12 is a flowchart of one embodiment of a process for analyzing the batch file.

FIG. 12 is a flowchart of one embodiment of a process for analyzing the batch file. In one embodiment, the batch processing module examines each of the records in the batch file individually or in groups or sets. The process is initiated if the batch processing module receives a batch file from a client application, adaptor or similar application (block 1201). Each of the records or files therein are sorted and analyzed. Amongst the files that are identified are each of the tax records or files (block 1203). If tax files are detected in the batch file or if the batch file conforms to a specification that requires tax records or files, then a check is made to determine if a payroll client or vendor associated with each tax file or record participates in the tax system of the automated financial service provider (block 1205).

If the payroll vendor or client participates in the tax system provided by the automated financial services provider, then the identified tax files are forwarded to the tax subsystem (block 1207). If the payroll vendor or client does not participate in the tax system, then the process proceeds to identify other types of files and records in batch file.

In one embodiment, ACH transaction files or records are identified (block 1209). If the ACH transaction files or records are detected in the batch file or if the batch file conforms to a specification that requires ACH transaction records or files, then a check is made to determine if a payroll client or vendor associated with each ACH transaction file or record participates in the ACH subsystem of the automated financial service provider (block 1211).

If the payroll vendor or client participates in the ACH system provided by the automated financial services provider, then the identified ACH files or records are forwarded to the ACH subsystem (block 1215). If the payroll vendor or client does not participate in the ACH system, then the process proceeds to identify other types of files and records in batch file.

In one embodiment, IRA files or records are identified (block 1213). If the IRA files or records are detected in the batch file or if the batch file conforms to a specification that requires IRA records or files, then a check is made to determine if a payroll client or vendor associated with each IRA file or record participates in the IRA subsystem of the automated financial service provider (block 1217).

If the payroll vendor or client participates in the IRA subsystem provided by the automated financial services provider, then the identified IRA files are forwarded to the IRA subsystem (block 1219). If the payroll vendor or client does not participate in the IRA system, then the process proceeds to identify other types of files and records in batch file (block 1221).

In one embodiment, the payroll file management system including the modules that generate and process the batch files may be implemented as hardware devices. In another embodiment, these components may be implemented in software (e.g., microcode, assembly language or higher level languages). These software implementations may be stored on a machine-readable medium. A "machine readable" medium may include any medium that can store or transfer information. Examples of a machine readable medium include a ROM, a floppy diskette, a CD-ROM, a DVD, flash memory, hard drive, an optical disk or similar medium.

Figure 13:
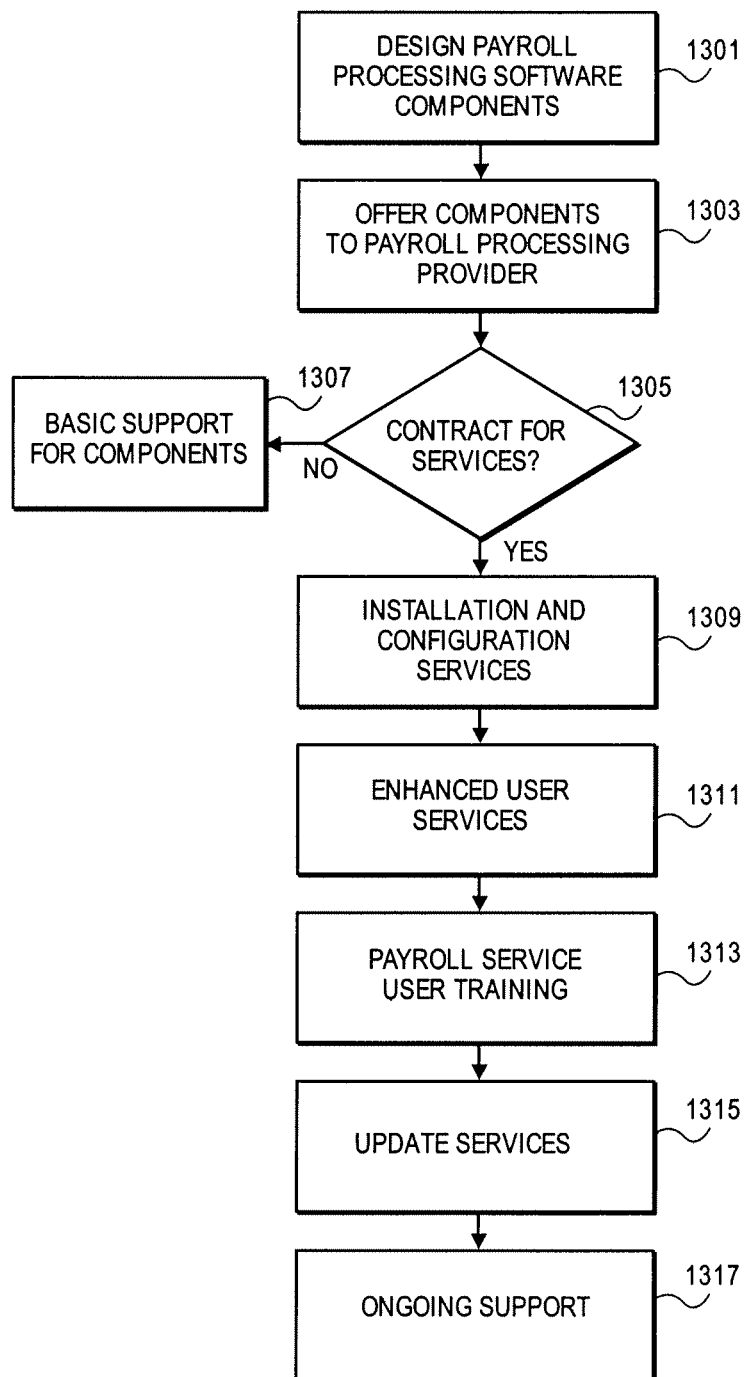
FIG. 13 is a diagram of one embodiment of a software as service method.

FIG. 13 is a diagram of one embodiment of a software as service method. The software as service process is implemented by a software developer or similar entity to provide a full spectrum of services to a payroll provider such as a vendor or end user. The payroll provider can also be a payroll service organization, payroll employment organization or any other payroll related service company. For sake of clarity, the following example describes the offering and provision of software and services to a payroll provider and/or the end users of the software and services. The software developer is in the best position to provide support services and also management of the software and thereby allow the payroll vendors and end users to focus on their core business.

The software developer begins this process with a development process to create the software components that implement the financial services that it will market to the payroll vendors and end users (block 1301). These software components can implement any of the automated financial services described above in any combination, including implementation of the entire automated financial service system. The software components can be implemented as backend components that are accessible through a web-based interface such as a web site, applications for local installation or access from a remote server, clients for interfacing with the remote components or web-based components or similar software implementations. The software developer, in the process of creating the software components, masters the financial rules and applicable regulations that relate to the financial services managed by the software components. Also, as the designer of the software, the software developer is knowledgeable about the optimal uses of the software components. The development process can be directed toward creating a product to be offered to the public (i.e., a large and diverse set of payroll provider including end users) or to specific payroll vendors and end users. The specific-use software components may be developed, at least in part, based on the requirements or specifications provided by the payroll vendor or end user.

The software components can be offered or licensed to payroll vendors and users of the automated financial services provided through the software components (block 1303). In one embodiment, the developer can sell components as a whole package or sell individual components or any combination thereof. For example, a payroll vendor that did not want to offer IRA transaction management or similar services to end users could elect not to purchase the corresponding component. However, the payroll vendor could still purchase and utilize the components that provide ACH transactions and similar services. The purchase of the software can be of stand alone components that may be installed on computers of the payroll vendor or end user or may be hosted by the payroll software developer and made accessible over a network such as the Internet.

In one embodiment, the software components can be bundled together into a contract for a larger range of services. In another embodiment, the software developer contracts for the provision of the software components as a service (block 1305). The software developer takes a large role in the management and servicing of the software by hosting them as web services, maintaining them on-site or remotely for local installations and providing remote server support to bring the functionality of the software components to the payroll vendor and end user, without the distractions of maintaining and supporting the software components themselves.

The software developer can also offer varying levels of support for which payroll vendors and end users can contract. If the payroll vendors or end users decide not to contract for the on-site support services, then the payroll service users can purchase software components and receive a basic level of support. The basic support level can include assistance with basic technical problems related to the software such as questions about installation, bug reporting, access and use of web-based components and similar issues (block 1307). The payroll vendors and end users can purchase or contract for any number or combination of software components and support services that are either web-based or local.

The software and support services can include installation and configuration services (block 1309). The software components can be installed on-site or remotely for the end user or vendor. The software components can be tailored for use on the machines owned by the end user or vendor and configured for the specific tasks and processes of the end user or vendor. Installation may be needed for local installations, clients for use of web-based services or remote services. The settings and configuration of the installed software components and computers hosting the software components can be updated as the end user or vendor's systems or needs change and as software components are added or modified for the payroll vendor and end users. The software developer can optimize the installation, operation and configuration as needed by the payroll vendor or end user, based on its extensive knowledge of the function and architecture of the software components. The installation or configuration can also include setting up interoperability with other payroll vendor and user programs such as human resource management and time and attendance software.

Additional services are offered to the payroll vendors and end users that can be provided to varying degrees by the software developer (block 1311). These enhancements can include access to software components and the automated financial services over a private network or public network. A private network can include a LAN, virtual private network (VPN) or WAN such as the Internet. The servers and software necessary for the network services can be hosted or administered by the developer as a service. In the scenario where web-based services are offered the software developer can set up secured access to the web-based services through secured connections, virtual private networks (VPNs) or similar secure systems. For installations that are on-site, the payroll software developer can help configure network communications between local clients and servers belonging to the payroll vendors and end users.

The developer can also provide training for the staff of the payroll vendors and end users (block 1313). These trainings can be ongoing and be on-site, over a network, web-based, live or pre-recorded or similarly structured to ensure that the vendor and end users are up to date on the software and able to maximize the usage of the software components that the payroll vendors and user have purchased. Web-based training can be integrated into the software components to allow payroll vendors and end users to easily train new staff and provide overall ease of use.

The services can include the automatic or assisted update of the software (block 1315). The developer updates the software components as time passes and applicable regulations change. These updates can be automatically implemented at the web server, for web-based services, and downloaded over a network or can be installed on-site for local installations and local client software components. The updates can be for any subset of the software components purchased or utilized by a payroll vendor or end user.

These software and support services can be ongoing (block 1317). Any length or duration of the ongoing support can be contracted for. A vendor or similar payroll service provider may contract for software and support services on behalf of the end users who are clients of the vendor or similar provider. Similarly, the end users may contract directly for these software and support services or in combination with the services of the vendor. These bundles of software and services may be referred to as 'software as service.' The software as service method allows the payroll vendors and users to concentrate on their core businesses and to obtain improved support for their payroll processing and automated financial services and software.

Figure 14:
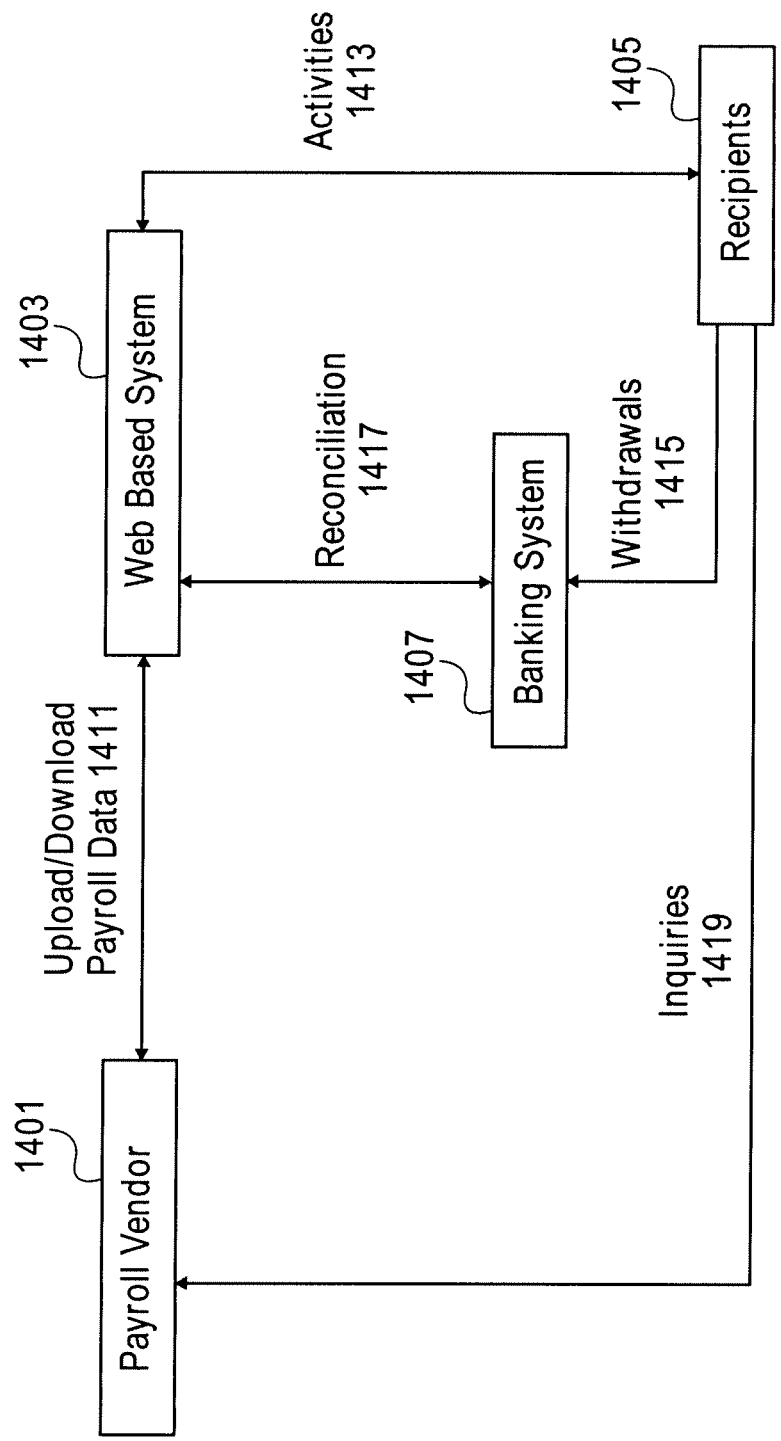
FIG. 14 is a diagram of one embodiment of a web-based system that is offered as a software as service by a software developer.

FIG. 14 is a diagram of one embodiment of a web-based system that is offered as a software as service by a software developer. In one example embodiment, the software services and components offered by the software developer are web-based services as illustrated. One skilled in the art would understand that similar systems for stand-alone or combination local client or program and remote server systems would rely on the same principles and features as discussed herein. The example of the web-based system is utilized for sake of clarity.

A payroll vendor 1401 connects with a web-based system 1403 to upload or download payroll data 1411 managed by the automated financial systems discussed herein above and provided by the web-based system 1403. As discussed above, the exchange of data can be in bulk filing systems, but may also be in any other form including individual transactions, files or records or similar units. The web-based system 1403 provides a user interface such as a graphical user interface for the payroll vendor 1401 or end user to access its payroll related data that is managed by the automated financial services of the web-based system 1403.

The web-based system 1403 forwards received payroll data to the appropriate automated financial services subsystems and responds to requests for account information from the payroll vendor or end users. The web-based system 1403 may communicate with the payroll vendor software 1401, such as a specialized client application, general purpose web browser (e.g., with a special plug-in), or similar program using any communication protocol or medium including secured communication protocols and mediums. In one example embodiment, the web-based system 1403 interacts with payroll vendor software 1401 including human resource management software and time and attendance software, as well as, payroll software to obtain the data required by the automated financial services utilized by the payroll vendor or end user. The web-based system also supports uploading 1411 payroll related data from banking software or other payroll related software.

The web-based system 1403 supports the payroll vender 1401 in the internal control, handling, maintenance and implementation of master files responding to governmental or other inquiries/tracers, amending prior quarter payroll tax returns and other payroll related transactions. The web-based system 1403 supports the payroll vendor and end user by combining payroll tax processing functions, banking functions and auto reconciliation of bank accounts in a single set of integrated services and software components.

The web-based system 1403 supports a large number of automated financial services as discussed herein above. These services may include IRA, 401(k), cafeteria plans and other benefit plan administration. The services may include support for workers compensation, garnishments, unemployment consulting and other related programs. The services may include support for banking oriented services, employee paycard, official bank checks (OBC) and other related banking services. The services may also include support for bank reconciliation, available funds investment, draw down Fed wires (reverse) and other account services.

The web-based system 1403 sends activities 1413 to recipients 1405, as needed by its subsystems. For example, these activities can include disbursements to financial institutions and tax collection entities to affect tax processing and financial plan implementation. Any type of activity and end recipient 1405 can be supported by the web-based system 1403. The activities 1413 can be sent via any communication method including standard mail, electronic communication (e.g., email) or similar methods and systems.

The recipients 1405 process the activities 1413 that they receive. For example, if the recipient is a state tax collection agency that has received an activity 1413 in the form of a payment for quarterly tax obligations of an end user, then the state tax collection agency makes a bank transaction in the form of a withdrawal 1415 from the bank system 1407. Similar transactions may be performed by other types of recipients. Some activities require that the recipients generate inquiries 1419, traces or similar requests for information. These requests 1419 are sent directly to a payroll vendor or end user. The web-based system 1403 may help the payroll vendor or end user 1401 to respond to the requests by providing information and response generating software components.

The banking system 1407 receives withdrawal 1407 requests and similar transactions from recipients 1405. In one embodiment, the banking system 1407 utilizes a bank account managed by the web-based system provider (e.g., the payroll processing software developer) where each vendor, end user or similar payroll provider has a separate sub-account that is managed by the web-based system 1403 and the funds in these sub-accounts are held in trust by the web-based system 1403. The banking system 1407 services the transaction generated by withdrawals and similar requests by transferring funds from the appropriate banking sub-accounts to the recipient's bank account. The records of each sub-accounts in the transaction are appropriately updated. Management of funds in this manner provides a further service to the payroll providers and allow for better management and investment of the funds, which can be managed by or through the web-based system 1403.

The web-based system 1403 periodically reconciles 1417 the banking data, e.g., sub-accounts balances and transactions, maintained through the banking system 1407. This service alleviates this burden from the payroll vendor 1401 and end user. Reconciliation 1417 may be done at any interval or upon notification of a completed transaction by the banking system. The system against those tracked by the web-based system 1403 and corrects, resolves or reports discrepancies that are detected.

In view of the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
   contracting with a payroll service provider to provide payroll processing software as a service, the payroll service provider to provide payroll processing services to a plurality of clients;
   providing the payroll processing software and support services to the payroll provider, the payroll processing software provided through a web server by an automated financial services provider separate from the payroll provider; and
   processing payroll files controlled by the payroll service provider through the payroll processing software on the web server, wherein the clients manage the payroll files using the payroll processing software, and wherein the payroll files are received by the web server, using the payroll processing software, from one of the plurality of clients of the payroll service provider, the payroll processing software providing separate account control of each of the plurality of clients to the payroll services provider including separate client activity management, automated client trust fund reconcilement, tax functions and banking functions.

2. The method of claim 1, further comprising:
   training any one of the payroll service provider or a client of the payroll service provider on the payroll processing software.

3. The method of claim 1, further comprising:
   installing the payroll processing software for the payroll service provider.

4. The method of claim 1, further comprising:
   setting up web-based access for the payroll processing software.

5. The method of claim 4, wherein the web-based access is over a private network.

6. The method of claim 4, wherein the web-based access is over an Internet.

7. The method of claim 1, further comprising:
   developing the payroll processing software.

8. The method of claim 1, wherein the payroll service provider is any one of a payroll processing company, payroll service consultant or an independent sales organization.

9. The method of claim 1, wherein the payroll processing software includes automated clearing house (ACH) transaction processing.

10. The method of claim 1, wherein the payroll processing software includes a trust management system.

11. The method of claim 1, wherein the payroll processing software includes a payroll tax processing system to execute the tax functions.

12. The method of claim 1, wherein the payroll processing software supports multiple clients.

13. The method of claim 1, wherein the payroll processing software supports batch file processing.

14. The method of claim 1, wherein payroll processing software provides individual retirement account (IRA) administration, 401(k) account administration, cafeteria plan administration, workers compensation administration, garnishment program administration and unemployment program administration.

15. The method of claim 1, wherein the payroll processing software supports receiving input data from other payroll processing software, human resource software or time and attendance software.

16. The method of claim 1, wherein the payroll processing software supports the banking functions including paycard, official bank checks, bank reconciliation, available funds investments, or draw down Federal wires.

17. The method of claim 11, wherein the payroll tax processing system prepares tax data for the filing of tax deposits and tax returns based on a jurisdiction of a client of the payroll service processor.

18. The method of claim 17, wherein the tax processing system and the ACH transaction processing is implemented with a double entry accounting system.

19. The method of claim 17, wherein the payroll tax processing system executes bulk filing.

20. The method of claim 17, wherein the tax processing system executes ACH transactions to pay taxes.

21. The method of claim 17, wherein the web server provides an interface for specifying tax system and bulk filing preferences for the payroll service processor.

22. The method of claim 17, wherein the tax processing system accepts and makes available tax notices from federal, state and local tax authorities.

* * * * *